United States Patent
Kataoka

(10) Patent No.: US 12,129,968 B2
(45) Date of Patent: Oct. 29, 2024

(54) PRESSURE VESSEL

(71) Applicant: TOYOTA JIDOSHA KABUSHIKI KAISHA, Toyota (JP)

(72) Inventor: Chiaki Kataoka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 17/809,761

(22) Filed: Jun. 29, 2022

(65) Prior Publication Data
US 2023/0003346 A1    Jan. 5, 2023

(30) Foreign Application Priority Data
Jul. 2, 2021   (JP) .................................. 2021-110899

(51) Int. Cl.
*F17C 13/04*   (2006.01)

(52) U.S. Cl.
CPC ...... *F17C 13/04* (2013.01); *F17C 2205/0326* (2013.01); *F17C 2205/0332* (2013.01); *F17C 2221/012* (2013.01); *F17C 2250/03* (2013.01); *F17C 2250/0478* (2013.01); *F17C 2270/0178* (2013.01); *F17C 2270/0184* (2013.01)

(58) Field of Classification Search
CPC ............. F17C 13/04; F17C 2205/0326; B60K 2015/03421; B60K 2015/03388
See application file for complete search history.

(56) References Cited

U.S. PATENT DOCUMENTS

| | | | |
|---|---|---|---|
| 2010/0276024 A1* | 11/2010 | Iida | ................... H01M 8/04089 137/899 |
| 2018/0147935 A1 | 5/2018 | Okawachi | |
| 2021/0039489 A1 | 2/2021 | Kataoka | |

FOREIGN PATENT DOCUMENTS

| | | | | |
|---|---|---|---|---|
| CN | 108799817 A | * | 11/2018 | ............... A62C 3/07 |
| DE | 102013226913 A1 | * | 6/2015 | ............ F17C 13/123 |
| JP | 2007106262 A | | 4/2007 | |
| JP | 2018086875 A | | 6/2018 | |
| JP | 2021028519 A | | 2/2021 | |

OTHER PUBLICATIONS

CN108799817A Translation (Year: 2018).*
DE102013226913A1 (Year: 2015).*

* cited by examiner

*Primary Examiner* — Schyler S Sanks
(74) *Attorney, Agent, or Firm* — Dickinson Wright, PLLC

(57) ABSTRACT

Provided is a pressure vessel capable of adapting a release direction of gas in the pressure vessel (i.e., release-permitted direction) and a direction in which the gas in the pressure vessel should not be released (i.e., release-restricted direction) to an attitude of a vehicle or a surrounding environment. A release direction control unit is configured to variably change, with respect to the pressure vessel, a release direction of gas as a pressure relief valve opens, and without depending on an attitude of the pressure vessel, release the gas stored in the pressure vessel as the pressure relief valve opens (only) in the release-permitted direction set in advance with respect to a gravity direction, not in the release-restricted direction set in advance with respect to the gravity direction.

10 Claims, 25 Drawing Sheets

PRESSURE VESSEL

CROSS REFERENCE TO RELATED APPLICATIONS

The present application claims priority from Japanese patent application JP 2021-110899 filed on Jul. 2, 2021, the entire content of which is hereby incorporated by reference into this application.

BACKGROUND

Technical Field

The present disclosure relates to a pressure vessel.

Background Art

JP 2018-086875 A discloses a vehicle having a plurality of pressure vessels (also referred to as high-pressure tanks, for example) storing gas. These pressure vessels have pressure relief valves, each configured to open when a temperature of the pressure vessel reaches a predetermined temperature or higher. Each of the pressure relief valves has a gas release direction adjusted so as to release the gas in the pressure vessel in a predetermined direction, such as an obliquely rearward and downward direction of the vehicle. JP 2021-028519 A discloses a pressure vessel mounting structure incorporating a fusible-plug-type pressure relief valve (also referred to as a fusible plug valve, for example) as such a pressure relief valve.

SUMMARY

In the above-stated conventional pressure vessel, since gas is released in a fixed direction when the pressure relief valve is open, there may be some inconvenience depending on the attitude of the vehicle or the surrounding environment. That is, in the above-stated conventional pressure vessel, when the pressure vessel (pressure relief valve) is mounted on the vehicle, for example, the release direction of the gas from the pressure relief valve is a single direction determined with respect to the vehicle. When viewed in reference to the vehicle, however, there may be some direction in which the gas should not be released depending on the attitude of the vehicle.

The present disclosure has been made in view of the foregoing, and provides a pressure vessel capable of adapting a release direction of the gas in the pressure vessel (i.e., release-permitted direction) and a direction in which the gas in the pressure vessel should not be released (i.e., release-restricted direction) to the attitude of the vehicle or the surrounding environment.

In view of the foregoing, a pressure vessel according to the present disclosure stores gas and includes: a pressure relief valve configured to open when a temperature of the pressure vessel reaches a predetermined temperature or higher; and a release direction control unit configured to release the gas in a predetermined direction as the pressure relief valve opens. The release direction control unit is configured to: variably change, with respect to the pressure vessel, a release direction of the gas as the pressure relief valve opens, and without depending on an attitude of the pressure vessel, release the gas stored in the pressure vessel as the pressure relief valve opens in a release-permitted direction set in advance with respect to a gravity direction, not in a release-restricted direction set in advance with respect to the gravity direction.

In some embodiments, the release direction control unit is configured to variably change, with respect to the pressure vessel, a release direction of the gas as the pressure relief valve opens so as to offset a change in an attitude of the pressure vessel.

In some embodiments, the release direction control unit includes a guide member provided with a release opening or a release passage for releasing the gas and configured to move rotationally relative to the pressure vessel, and is configured to allow the guide member to move rotationally relative to the pressure vessel in accordance with a change in an attitude of the pressure vessel, and variably change, with respect to the pressure vessel, a release direction of the gas as the pressure relief valve opens.

In some embodiments, the pressure vessel is provided with a projection portion having a plurality of release passages for releasing the gas. The guide member is slidably mounted around the projection portion and includes a shield wall that comes into sliding contact with an outer surface of the projection portion and the release opening for releasing the gas, and is configured to, when an attitude of the pressure vessel changes, move rotationally relative to the projection portion, close a release passage facing the release-restricted direction with the shield wall, and open a release passage facing the release-permitted direction with the release opening.

In some embodiments, the guide member is configured to, when an attitude of the pressure vessel changes, open one release passage facing the release-permitted direction with the release opening.

In some embodiments, the pressure vessel is provided with a projection portion having at least one release passage for releasing the gas. The guide member is mounted around the projection portion with a gap that allows the gas to pass therethrough, and includes a shield wall that is opposed to an outer surface of the projection portion and the release opening for releasing the gas, and is configured to, when an attitude of the pressure vessel changes, move rotationally relative to the projection portion, when the release passage is facing the release-restricted direction, block the gas to be released in the release-restricted direction through the release passage with the shield wall and release the gas from the release opening via the gap formed between the projection portion and the shield wall, and when the release passage is facing the release-permitted direction, release the gas to be released in the release-permitted direction through the release passage from the release opening not via the gap.

In some embodiments, the guide member includes a plurality of release openings, and the shield wall is provided with a protrusion for releasing the gas to be released in the release-restricted direction through the release passage from one of the plurality of release openings via the gap formed between the projection portion and the shield wall.

In some embodiments, the pressure vessel is provided with a storage portion including a storage chamber that is open to an outside via an open space, and the guide member is rotatably stored in the storage chamber of the storage portion and includes a plurality of release passages for releasing the gas, and is configured to, when an attitude of the pressure vessel changes, move rotationally relative to the storage portion and open a release passage facing the release-permitted direction via the open space.

In some embodiments, the open space is configured such that one of the plurality of release passages is opened when an attitude of the pressure vessel changes.

In some embodiments, the guide member is configured such that a center of gravity is disposed eccentrically with respect to a center of rotation, and without depending on an attitude of the pressure vessel, an attitude with respect to a gravity direction does not change by gravity.

In some embodiments, the pressure vessel includes an inclination sensor for detecting an attitude of the pressure vessel, a motor for allowing the guide member to move rotationally, and a controller for controlling operation of the motor to allow the guide member to move rotationally, in which the controller is configured to control operation of the motor based on the attitude of the pressure vessel detected by the inclination sensor.

In some embodiments, the release-restricted direction includes a predetermined angular range with respect to a horizontal direction and the release-permitted direction includes a predetermined angular range with respect to a vertical direction other than the release-restricted direction.

According to the present disclosure, since the release direction of the gas in the pressure vessel (i.e., release-permitted direction) and the direction in which the gas in the pressure vessel should not be released (i.e., release-restricted direction) can be variably changed with respect to the pressure vessel including the pressure relief valve, it is possible to adapt the release direction of the gas in the pressure vessel (i.e., release-permitted direction) and the direction in which the gas in the pressure vessel should not be released (i.e., release-restricted direction) to the attitude of the vehicle or the surrounding environment.

In other words, it is possible to control the release direction of the gas from the pressure relief valve without depending on the attitude of the vehicle or the surrounding environment.

DETAILED DESCRIPTION

Hereinafter, embodiments of the present disclosure will be described with reference to the drawings.

(Schematic Configurations of Vehicle 100 and Pressure Vessel Unit 1)

With reference to FIG. 1 to FIG. 4, schematic configurations of a vehicle and a pressure vessel unit according to an embodiment of the present disclosure will be described. Basically, the configurations to be described based on FIG. 1 to FIG. 4 commonly apply to first to fourth embodiments of a release direction control unit of a pressure vessel to be explained below. It should be noted that an arrow FR, an arrow UP, and an arrow RH given to each figure as appropriate respectively indicate the front side, upper side, and right side of the vehicle in a vehicle 100 to which the pressure vessel is applied. Hereinafter, when a description is made by use of merely the front and rear sides, the upper and lower sides, and the right and left sides, they indicate the front and rear sides in the vehicle front-rear direction, the upper and lower sides in the vehicle up-down direction, and the right and left sides in the vehicle width direction in a state of the vehicle facing an advancing direction, respectively, unless otherwise specified.

(Vehicle 100)

Figure 1:
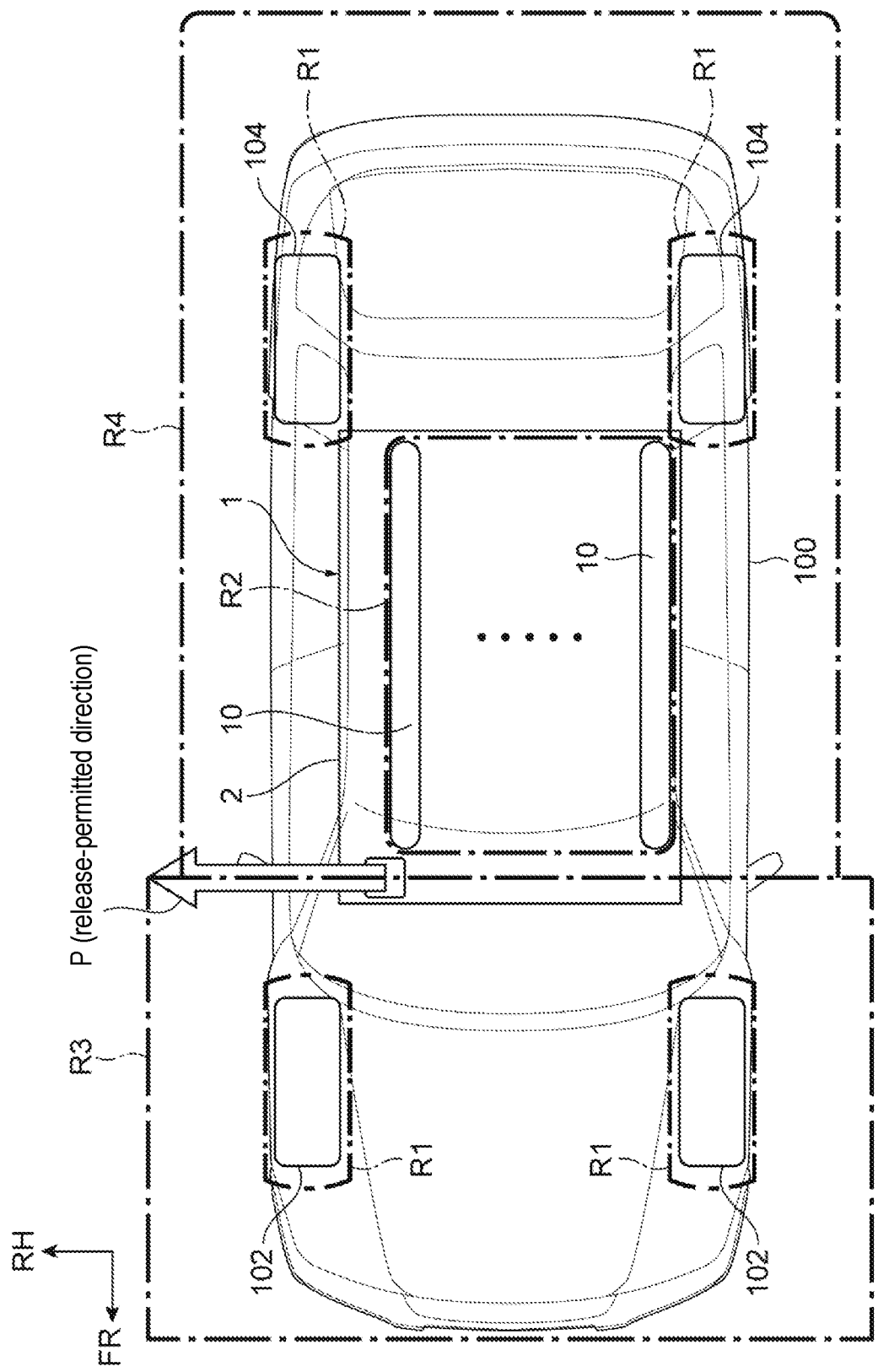
FIG. 1 is a plan view schematically showing a vehicle to which a pressure vessel according to the present embodiment is applied, with an example of a release-restricted range (direction) and a release-permitted range (direction)
Figure 2:
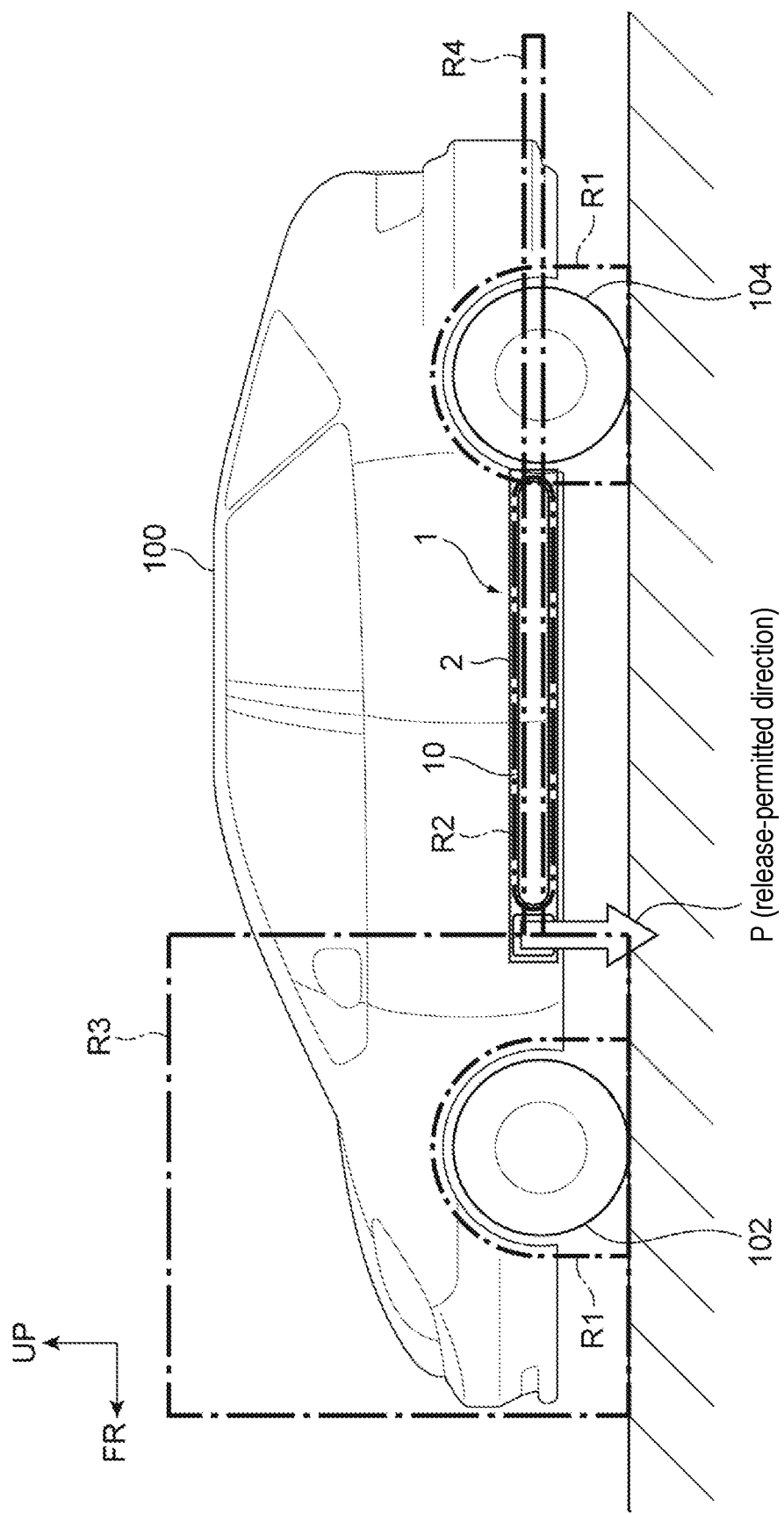
FIG. 2 is a side view schematically showing the vehicle to which the pressure vessel according to the present embodiment is applied, with an example of a release-restricted range (direction) and a release-permitted range (direction)
Figure 3:
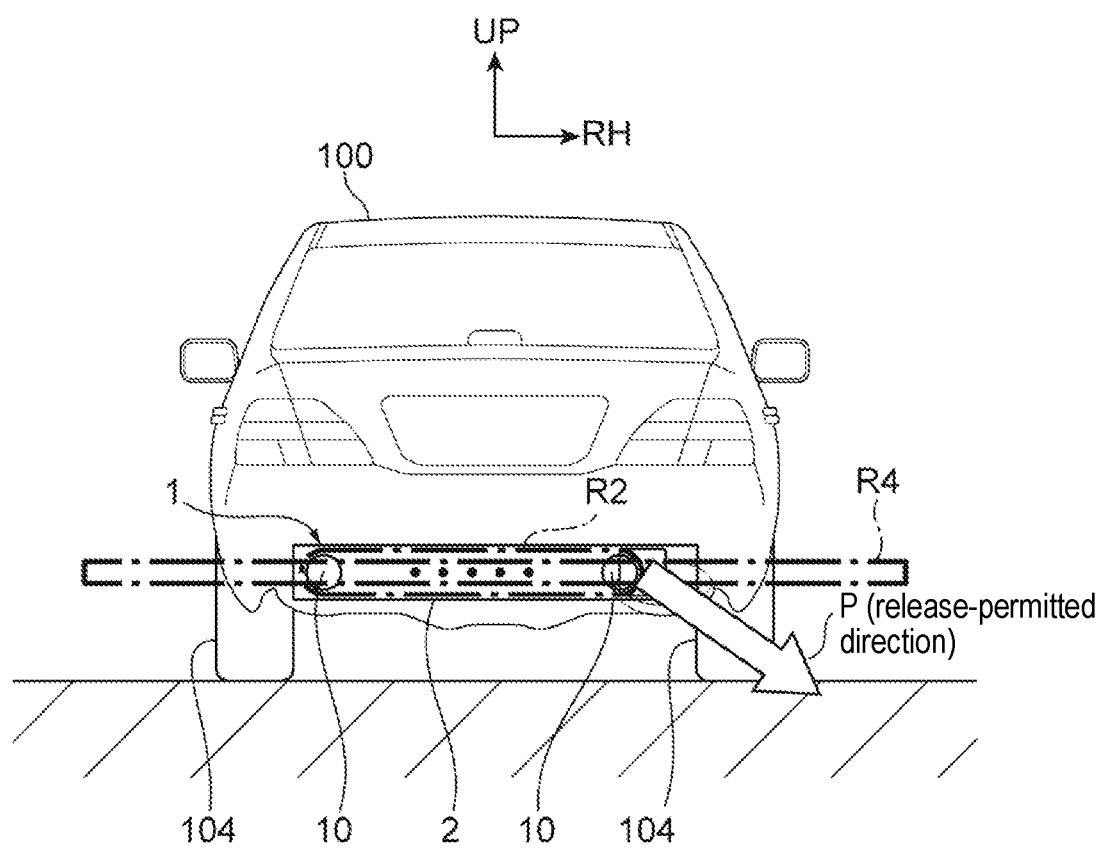
FIG. 3 is a rear view schematically showing the vehicle to which the pressure vessel according to the present embodiment is applied, with an example of a release-restricted range (direction) and a release-permitted range (direction)

As shown in FIG. 1 to FIG. 3, the vehicle 100 to which the pressure vessel according to the present embodiment is applied includes a motor (not shown) as a driving source. The motor is mechanically coupled to driving wheels (at least either of front wheels 102 or rear wheels 104) of the vehicle 100 directly or indirectly via shift means such as a deceleration gear train. This transmits the driving force output from the motor to the driving wheels.

Further, the vehicle 100 includes a fuel cell stack (not shown). Electric power is generated when hydrogen and air are supplied to the fuel cell stack, and the electric power is supplied from the fuel cell stack to the motor so that the motor is driven. That is, the vehicle 100 is a so-called fuel cell vehicle.

(Pressure Vessel Unit 1)

A pressure vessel unit 1 is disposed between the front wheels 102 and the rear wheels 104 in a lower part of the vehicle 100. More specifically, the pressure vessel unit 1 is disposed below a floor panel (not shown) constituting a floor of a vehicle cabin.

The pressure vessel unit 1 includes a case 2 formed in a box-shape, and a pressure vessel 10 is provided inside of the case 2.

It should be noted that areas R1, R2, R3, R4 indicated by dashed and single-dotted lines in FIG. 1 to FIG. 3 are examples of a range (direction) in which gas should not be released under the laws and regulations, in other words, a range (direction) in which the release of gas is restricted (hereinafter this may also be referred to as a release-restricted range). This release-restricted range includes a release-restricted range R1 in a wheel housing or in a direction of the wheel housing, a release-restricted range R2 of the pressure vessel unit 1 (or the pressure vessel 10 thereof), a release-restricted range R3 in the front side of the vehicle (ahead of the vehicle cabin thereof), and a release-restricted range R4 in a horizontal direction (in parallel with the road surface) from the rear part or the side face of the vehicle.

In addition, an area (direction) P indicated by a hollow arrow by solid lines in FIG. 1 to FIG. 3 is an example of a range (direction) in which the release of gas is permitted (hereinafter this may also be referred to as a release-permitted range).

(Pressure Vessel 10)

Figure 4:
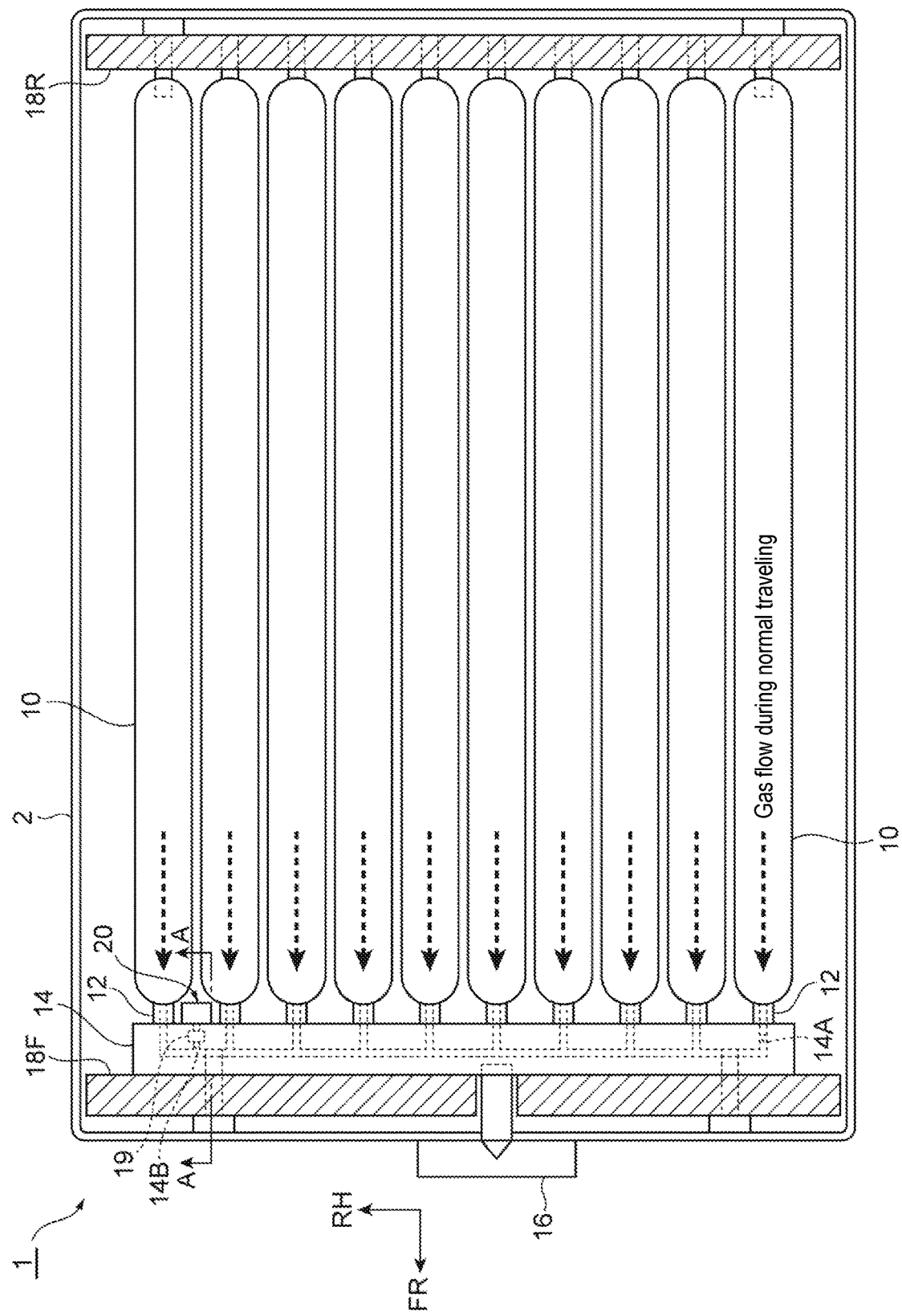
FIG. 4 is a plan view schematically showing the overall configuration of a pressure vessel unit to which the pressure vessel according to the present embodiment is applied.

As shown in FIG. 4, a plurality of pressure vessels 10 is disposed inside of the case 2 of the pressure vessel unit 1. Each of the pressure vessels 10 extends in the vehicle front-rear direction as an axial direction, and is formed in a substantially cylindrical shape. These pressure vessels 10 are configured to store therein a hydrogen gas as a high-pressure gas.

In the present embodiment, ten pressure vessels 10 are provided inside of the case 2 so as to be arranged side by side in a line (in a layer) in the vehicle width direction. It should be noted that in the present embodiment, the pressure vessel 10 is made of an aluminum alloy as a main component, but is not limited thereto, and may be made of a resin as a main component. For example, the pressure vessel 10 is configured to have an outer layer as a reinforcing layer made of carbon fiber impregnated with resin (carbon fiber-reinforced resin) on the outer circumference of a resin liner.

(Manifold 14)

Here, a mouthpiece 12 is attached to an end portion of the pressure vessel 10, on one side in the axial direction (the vehicle front side), and a manifold 14 as a pipe is coupled to the mouthpiece 12. The manifold 14 extends along the front wall of the case 2, with its longitudinal direction being along the vehicle width direction. The manifold 14 includes a general passage 14A via which internal spaces of the plurality of pressure vessels 10 communicate with each other. Further, a valve 16 is provided at the center of the manifold 14 in the longitudinal direction, and the pressure vessels 10 communicate with the valve 16 provided on the outside of the case 2 via the general passage 14A. The valve 16 is an opening-closing valve having a function to open and close the pressure vessels 10, and the valve 16 is coupled to the above-stated fuel cell stack (not shown) via coupling means such as a pipe. By adjusting opening and closing of the valve 16, a supply amount of hydrogen gas to be supplied to the fuel cell stack from the pressure vessels 10 is adjusted.

The manifold 14 is fixed to the lower face side of the case 2 via a protector 18F disposed on the vehicle front side.

Meanwhile, an end portion of the pressure vessel 10, on the other side in the axial direction (the vehicle rear side) is fixed to the lower face side of the case 2 via a protector 18R disposed on the vehicle rear side. This prevents the pressure vessel 10 from moving in the case 2.

Figure 5:
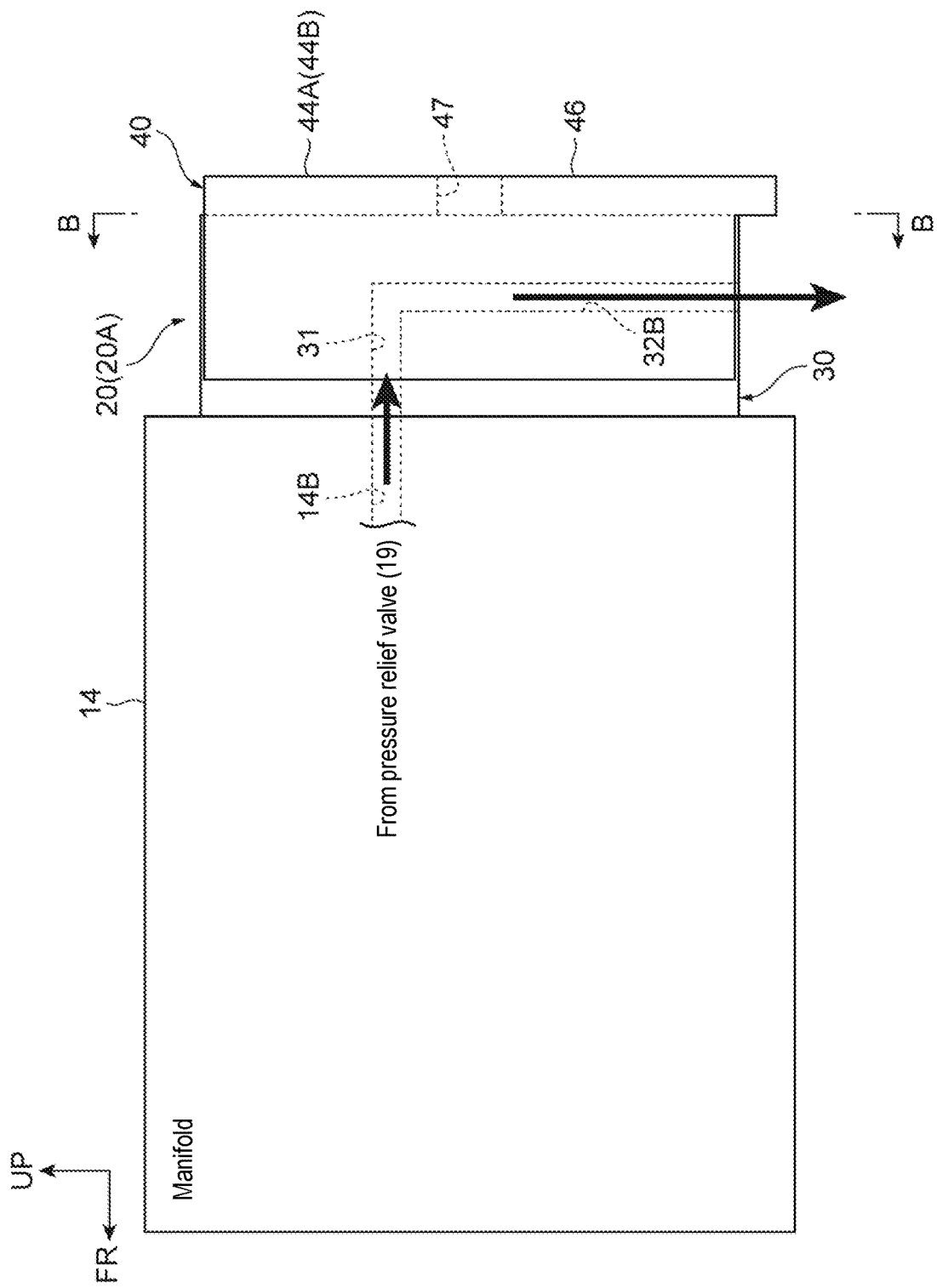
FIG. 5 is an enlarged cross-sectional view showing a portion around a release direction control unit cut along line A-A in FIG. 4 in an enlarged manner according to a first embodiment.

As shown in FIG. 4 and FIG. 5, the manifold 14 includes a discharge gas passage 14B branching from the general passage 14A, in the vicinity of an outer end portion (a right end portion in FIG. 4) in the vehicle width direction. The discharge gas passage 14B extends to the vehicle rear side from the general passage 14A. This discharge gas passage 14B is provided with a pressure relief valve 19.

(Pressure Relief Valve 19)

The pressure relief valve 19 is a valve mechanism configured to open when a temperature of the pressure vessel 10 reaches a predetermined temperature or higher. In the present embodiment, a fusible-plug-type pressure relief valve is provided as the pressure relief valve 19. The pressure relief valve 19 is configured to release the hydrogen gas in the pressure vessel 10 to the outside when the temperature of the pressure vessel 10 reaches a predetermined temperature or higher because of fire or the like, so as to prevent the pressure vessel 10 from having an excessively high inner pressure. Normally, the discharge gas passage 14B is configured to be closed by the pressure relief valve 19.

The pressure relief valve 19 includes a heat-sensitive portion formed of a fusible alloy made of a material such as low-melting metal, e.g., lead, tin, or the like as an example. When the temperature of the vehicle lower part becomes high for example, and reaches a predetermined temperature or higher, the heat-sensitive portion melts. In other words, the heat-sensitive portion is formed of an alloy that melts when the pressure relief valve 19 is exposed to a predetermined temperature higher than a supposed temperature under a normal gas-supply condition. For example, a binary alloy formed of bismuth (Bi) and indium (In) is used for the heat-sensitive portion.

When the temperature of the vehicle lower part becomes high for example, and reaches a predetermined temperature or higher, the heat-sensitive portion of the pressure relief valve 19 melts, so that the discharge gas passage 14B is opened.

That is, in the present embodiment, the pressure vessel 10 storing a high-pressure gas therein is mounted in the lower part of the vehicle 100, and the manifold 14 is coupled to the pressure vessel 10. The manifold 14 includes the general passage 14A and the discharge gas passage 14B, and the general passage 14A allows the pressure vessel 10 to communicate with the valve 16. Meanwhile, the discharge gas passage 14B branches from the general passage 14A and is normally closed by the pressure relief valve 19. When the temperature of the lower part of the vehicle 100 becomes high under the heating environment for example, and reaches a predetermined temperature or higher, at least a portion (heat-sensitive portion) of the pressure relief valve 19 melts and the discharge gas passage 14B is opened, so that the high-pressure gas stored in the pressure vessel 10 is discharged from the discharge gas passage 14B.

For the detailed structure of the pressure relief valve 19, refer to JP 2021-028519 A, for example, as appropriate. In addition, the pressure relief valve 19 can have any structure as long as it is designed to open when the temperature reaches a predetermined temperature or higher.

As described above, when the discharge gas passage 14B is opened, it communicates with a release passage of a release direction control unit 20, which will be described later. Accordingly, the high-pressure gas is configured to flow through the discharge gas passage 14B and to be released through the release passage that opens to the outside of the case 2 (which will be described later).

It should be noted that the position of the pressure vessel unit 1 mounted is not limited to the illustrated example. For example, the pressure vessel unit 1 may be mounted below the rear seat or in the rear part of the vehicle, for example. In addition, the arrangement of the pressure vessels 10 inside of the case 2 is not limited to the illustrated example. For example, a plurality of lines (a plurality of layers) of the pressure vessels 10 may be arranged side by side in the vehicle width direction, or one line (one layer) of the pressure vessels 10 or a plurality of lines (a plurality of layers) of the pressure vessels 10 may extend with their axial direction being along the vehicle right-left direction and be arranged side by side.

In the present embodiment, the vehicle 100 is a fuel cell vehicle and stores a hydrogen gas that is a fuel gas in the pressure vessel 10, but the example of a gas stored is not limited thereto. For example, the vehicle 100 may store a natural gas that is a fuel gas in the pressure vessel 10.

In addition, it is needless to mention that the position or shape of the discharge gas passage 14B of the manifold 14, the configuration of the arrangement of the pressure relief valve 19, and the like are not limited to the illustrated example.

(Release Direction Control Unit 20)

To release the high-pressure gas to be discharged from the discharge gas passage 14B to the outside of the case 2, the high-pressure gas need be released, not to a release-restricted range (R1, R2, R3, R4) shown in FIG. 1 to FIG. 3, but only to a release-permitted range other than the release-restricted range. Herein, the release-restricted range (R1, R2, R3) except R4 is a range determined with respect to the vehicle 100. As for the release-restricted range (R4), it is considered that the range (direction) is not determined with respect to the vehicle 100, and may change, when viewed in reference to the vehicle 100, depending on the attitude of the vehicle or the surrounding environment (for example, roll or pitch of the vehicle 100).

Then, in the present embodiment, to adapt the release direction of the gas in the pressure vessel 10 (i.e., release-permitted direction) and the direction in which the gas in the pressure vessel 10 should not be released (i.e., release-restricted direction) to the attitude of the vehicle or the surrounding environment, a release direction control unit 20 is disposed on the rear side face (rear end face) of the manifold 14.

The release direction control unit 20, though a detailed structure thereof will be described later, includes a mechanism for releasing the gas in the pressure vessel 10 in a predetermined direction. The release direction control unit 20 is provided with a release passage that opens to the outside of the case 2 to release the gas to the outside of the case 2. The release passage of the release direction control unit 20 is coupled to the downstream side (rear end portion) of the discharge gas passage 14B. Accordingly, the high-pressure gas to be discharged from the discharge gas passage 14B is configured to be released in the predetermined direction outside of the case 2 (see the arrow directions in FIG. 1 to FIG. 3). It should be noted that the case 2 is provided with a release opening (not shown) for releasing the gas to be discharged from the release passage of the release direction control unit 20 to the outside of the case 2.

In the present embodiment, the release direction control unit 20 is configured to variably change, with respect to the vehicle 100 (or the pressure vessel 10 mounted thereon), the gas release direction as the pressure relief valve 19 opens so as to release the gas stored in the pressure vessel 10 as the pressure relief valve 19 opens, not in the release-restricted direction set in advance with respect to the gravity direction, but (only) in the release-permitted direction set in advance with respect to the gravity direction, without depending on the attitude (rotation, inclination) of the vehicle 100 (or the pressure vessel 10 mounted thereon).

Specifically, the release direction control unit 20 is configured to variably change, with respect to the vehicle 100 (or the pressure vessel 10 mounted thereon), the gas release direction as the pressure relief valve 19 opens so as to offset (cancel) the change in the attitude (rotation, inclination) of the vehicle 100 (or the pressure vessel 10 mounted thereon).

Specifically, the release direction control unit 20 is configured to allow a guide member (which can move rotationally relative to the pressure vessel 10), which will be described later, to move rotationally with respect to the pressure vessel 10 in accordance with the change in the attitude of the vehicle 100 (or the pressure vessel 10 mounted thereon), and variably change, with respect to the vehicle 100 (or the pressure vessel 10 mounted thereon), the gas release direction as the pressure relief valve 19 opens.

Here, in one example, the release-restricted direction (range) includes a predetermined angular range with respect to the horizontal direction and corresponds to the release-restricted range R4 of FIG. 1 to FIG. 3. In one example, the release-permitted direction (range) includes a predetermined angular range with respect to the vertical direction (gravity direction) other than the release-restricted direction and corresponds to the release-permitted range of FIG. 1 to FIG. 3 (a range other than the release-restricted ranges R1, R2, R3, R4).

Hereinafter, a detailed configuration of the above-described release direction control unit 20 will be described for each embodiment.

First Embodiment of Release Direction Control Unit 20

With reference to FIG. 5 to FIG. 10, a configuration of the first embodiment of the release direction control unit 20 (hereinafter referred to as a release direction control unit 20A) provided on the manifold 14 of the pressure vessel 10 will be described.

As shown in the figures, the release direction control unit 20A of the present embodiment basically includes a projection portion 30 for forming a release passage and a guide member 40 for defining the release passage.

The projection portion 30 is a cylindrical structure provided on the rear side face of the manifold 14. It should be noted that the projection portion 30 may be formed integrally with the manifold 14 or may be formed as a separate component.

The projection portion 30 is provided with a communication passage 31 communicating with the downstream side (rear end portion) of the discharge gas passage 14B and extending to the center of the projection portion 30. The projection portion 30 is provided with a plurality of (three in the illustrated example) release passages 32A, 32B, 32C branching from the downstream side (i.e., the center of the projection portion 30) of this communication passage 31. The three release passages 32A, 32B, 32C are provided so as to release the gas stored in the pressure vessel 10 to the outside of the case 2 as the pressure relief valve 19 opens. In the present embodiment, the three release passages 32A, 32B, 32C are formed to extend in a radial direction (radially) from the center and at angle intervals of approximately 60 degrees. In addition, in the present embodiment, in a state where the attitude of the vehicle is maintained substantially horizontal, the release passage 32B in the middle is arranged along the downward direction of the vehicle (in the gravity direction) and the release passages 32A, 32C are arranged along the oblique 60-degree downward direction of the vehicle with respect to the vehicle right-left direction.

Meanwhile, the guide member 40 is constituted of a substantially cylindrical body having a diameter substantially equal to that of the projection portion 30 (or the outside diameter thereof) and is slidably mounted around the projection portion 30 (or the outer circumference thereof), so as to be able to rotatably slide about the central axis of the projection portion 30.

The guide member 40 includes (a pair of) upper and lower release openings 42A, 42B (i.e., the pair of upper and lower release openings 42A, 42B is formed by cutting out upper and lower portions of the cylindrical portion) and shield walls 44A, 44B, which come into sliding contact with the outer circumference of the projection portion 30 and are formed by the portions (a pair of right and left portions) between the pair of upper and lower release openings 42A, 42B. The release openings 42A, 42B are formed to correspond to the release-permitted range (direction) (FIG. 1 to FIG. 3) so as to open a release passage facing the release-permitted range out of the three release passages 32A, 32B, 32C. Meanwhile, the shield walls 44A, 44B are formed to correspond to the release-restricted range (direction) (FIG. 1 to FIG. 3) and to come into sliding contact with the outer circumference of the projection portion 30, so as shield (close) a release passage facing the release-restricted range out of the three release passages 32A, 32B, 32C.

In the illustrated embodiment, each of the upper and lower release openings 42A, 42B is provided to have an angular range of approximately 60 degrees (i.e., approximately 30 degrees on each of the right and left sides with respect to the vertical direction), and each of the right and left shield walls 44A, 44B is provided to have an angular range of approximately 120 degrees (i.e., approximately 60 degrees on each of the upper and lower sides with respect to the horizontal direction).

The right and left shield walls 44A, 44B are coupled together by a connection portion 46 disposed so as to be opposed to the rear side face of the projection portion 30. In the present embodiment, the connection portion 46 has a substantially semicircular shape and couples together the lower half portions of the right and left shield walls 44A, 44B at their rear end portions (see in particular FIG. 7).

Figure 7:
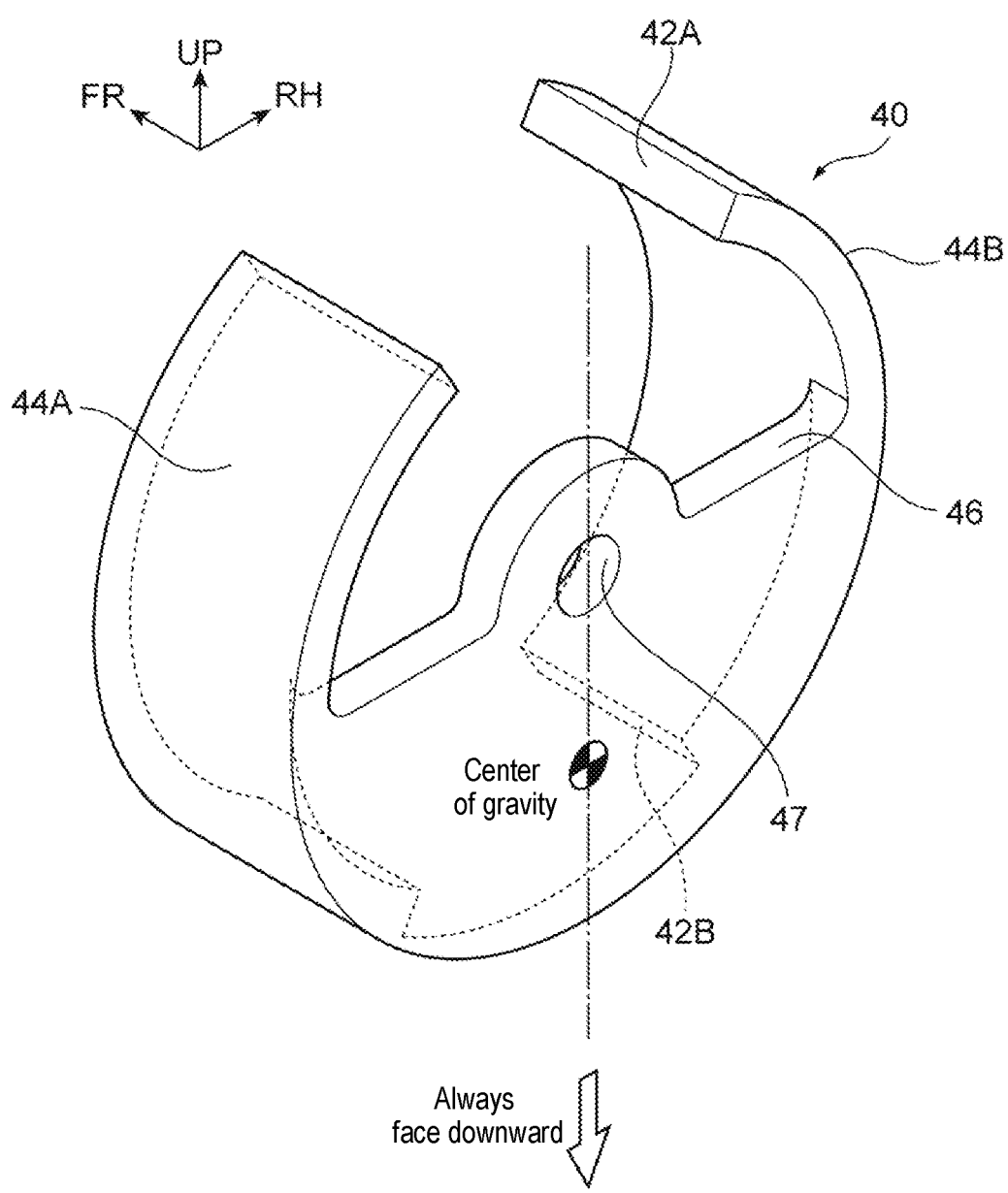
FIG. 7 is a perspective view showing a guide member of FIG. 6 in an enlarged manner.

In addition, an insertion hole 47 to which a support member (not shown) is inserted for rotatably supporting the guide member 40 on the projection portion 30 is formed at the center of the connection portion 46 (a portion corresponding to the center of the guide member 40 that is a substantially cylindrical body) (see in particular FIG. 7).

In the present embodiment, with the above-described configuration, the guide member 40 is configured such that the center of gravity is displaced downward (with respect to the center of rotation) (i.e., disposed eccentrically). Therefore, when the guide member 40 is rotatably supported on the projection portion 30 with the support member (not shown), even if the attitude of the vehicle 100 (i.e., the pressure vessel 10) changes (rotation or inclination), the guide member 40 moves rotationally relative to the projection portion 30 provided on the manifold 14 (more specifically, moves rotationally so as to offset the change in the attitude of the vehicle 100) such that the attitude with respect to the gravity direction will not change (will be maintained).

That is, the guide member 40 has the center of gravity such that the upper and lower release openings 42A, 42B always face the release-permitted range (direction) and the right and left shield walls 44A, 44B always face the release-restricted range (direction) (i.e., horizontal direction).

In other words, the guide member 40 is configured to shield (close) the release passage facing the release-restricted range out of the three release passages 32A, 32B, 32C with the shield walls 44A, 44B, and open the release passage (only one release passage in this example) facing the release-permitted range out of the three release passages 32A, 32B, 32C with the release openings 42A, 42B.

Figure 6:
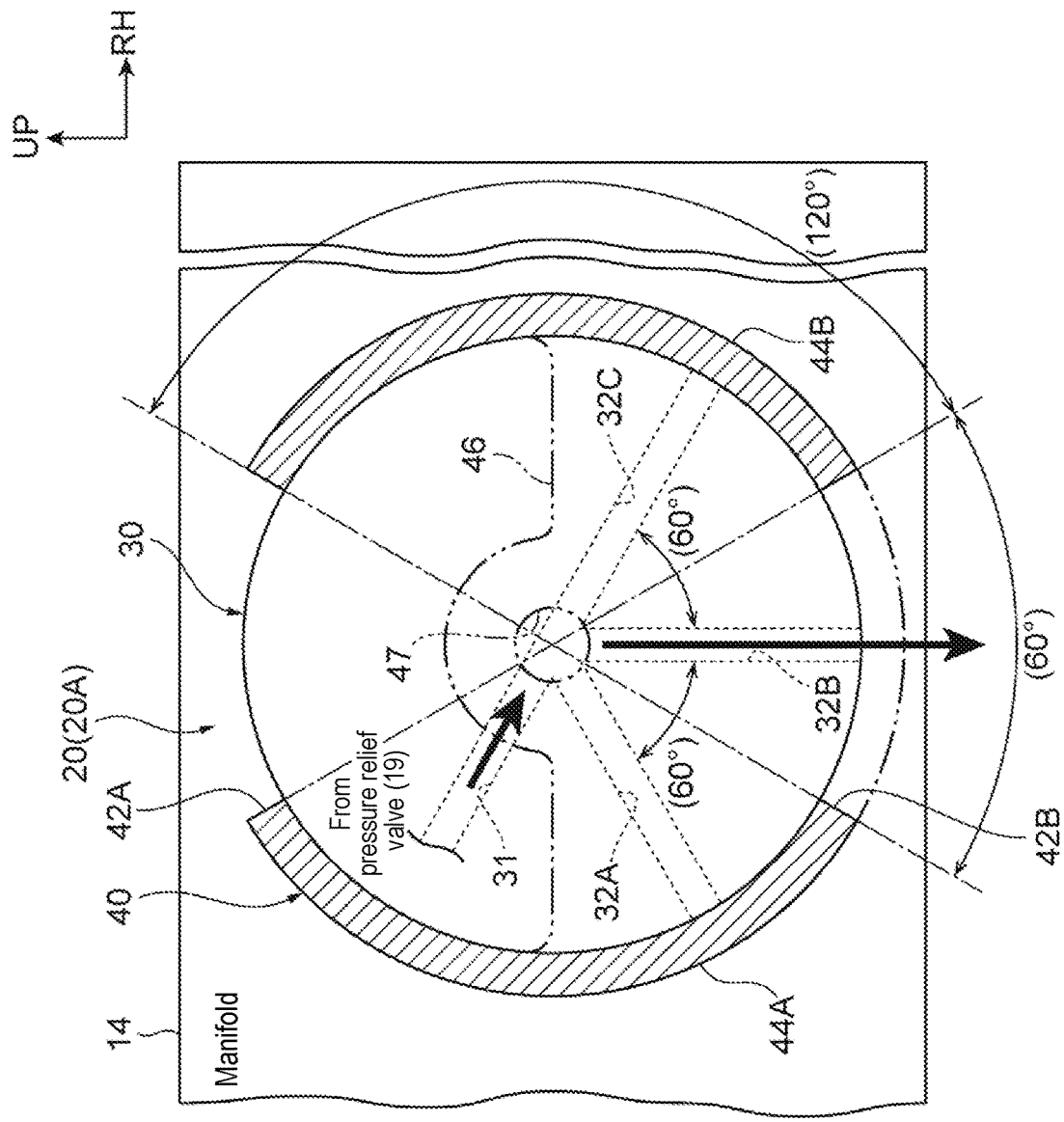
FIG. 6 is an enlarged cross-sectional view showing the portion around the release direction control unit cut along line B-B in FIG. 5.

Specifically, as shown in FIG. 6, when the vehicle 100 is not rotated (roll rotation in this example, the same applies hereinafter), the guide member 40 will not move rotationally relative to the projection portion 30 (the relative relation between the projection portion 30 and the guide member 40 will not change). In this case, out of the three release passages 32A, 32B, 32C of the projection portion 30, the release passage 32B in the middle along the downward direction of the vehicle is opened through the lower release opening 42B, and the release passages 32A, 32C located on the opposite sides of the release passage 32B are closed by the right and left shield walls 44A, 44B, respectively.

It should be noted that when the vehicle 100 is rotated in a counterclockwise or clockwise direction by about 30 degrees as viewed from the rear side, the state of the projection portion 30 and the guide member 40 is equal to that shown in FIG. 6.

Figure 8:
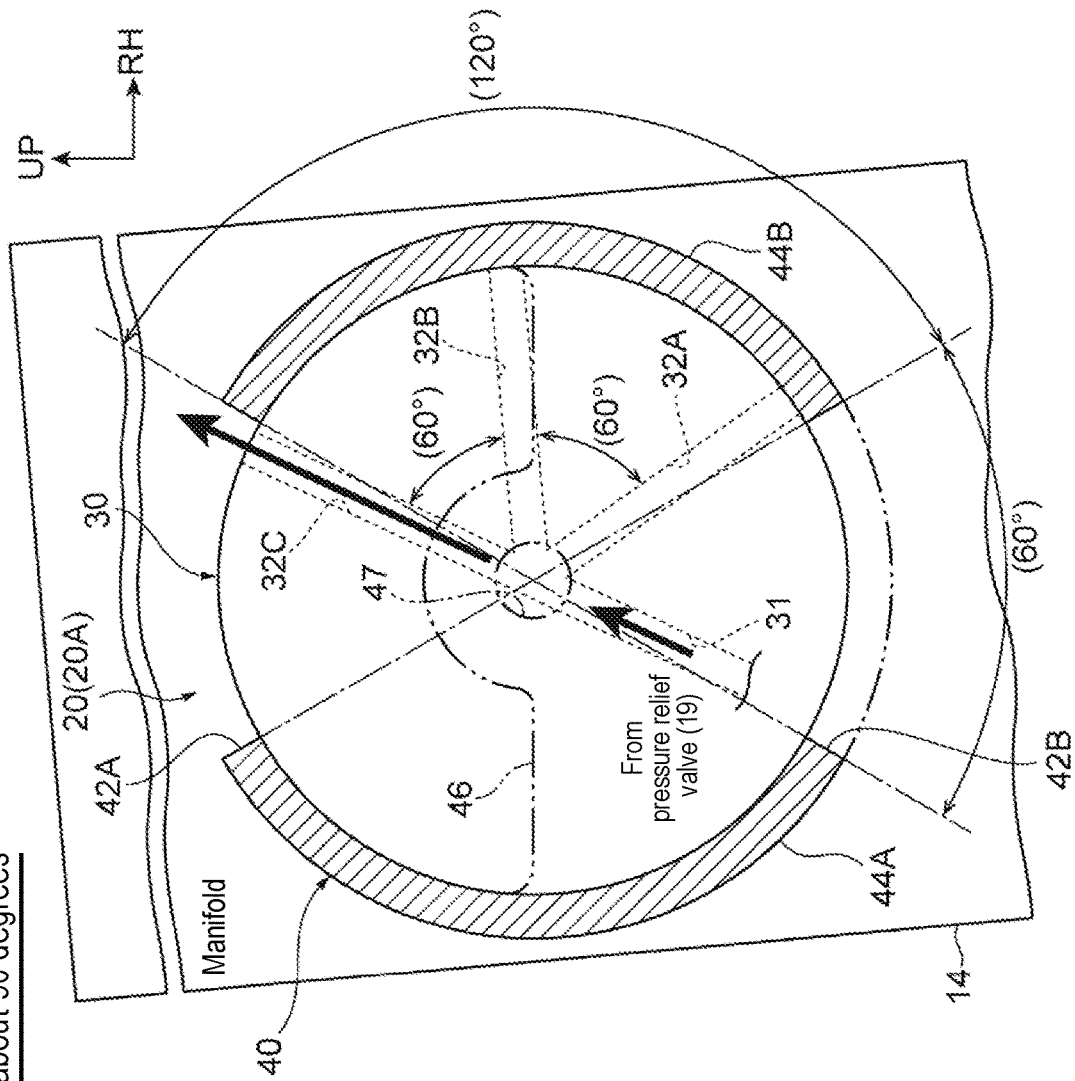
FIG. 8 is an enlarged cross-sectional view of the portion around the release direction control unit corresponding to FIG. 6, in a state where the pressure vessel (vehicle) is rotated in a counterclockwise direction by about 90 degrees from the state shown in FIG. 6.

As shown in FIG. 8, when the vehicle 100 is rotated in a counterclockwise direction by slightly more than 90 degrees as viewed from the rear side, in the same manner, the projection portion 30 is rotated in a counterclockwise direction by slightly more than 90 degrees as viewed from the rear side, but the guide member 40 will not be rotated (the attitude with respect to the gravity direction will not change), resulting in rotational movement of the guide member 40 relative to the projection portion 30 (the relative relation between the projection portion 30 and the guide member 40 will change). In this case, out of the three release passages 32A, 32B, 32C of the projection portion 30, the release passage 32C now facing upward by rotation is opened through the upper release opening 42A, and the remaining release passage 32A, 32B are closed by the right shield wall 44B.

It should be noted that when the vehicle 100 is rotated in a counterclockwise direction by about 30 degrees to about 90 degrees as viewed from the rear side, out of the three release passages 32A, 32B, 32C of the projection portion 30, the release passage 32A now facing downward by rotation is opened through the lower release opening 42B, and the remaining release passage 32B, 32C are closed by the right shield wall 44B.

When the vehicle 100 is rotated in a counterclockwise direction by about 90 degrees to about 150 degrees as viewed from the rear side, the state of the projection portion 30 and the guide member 40 is equal to that shown in FIG. 8.

Figure 9:
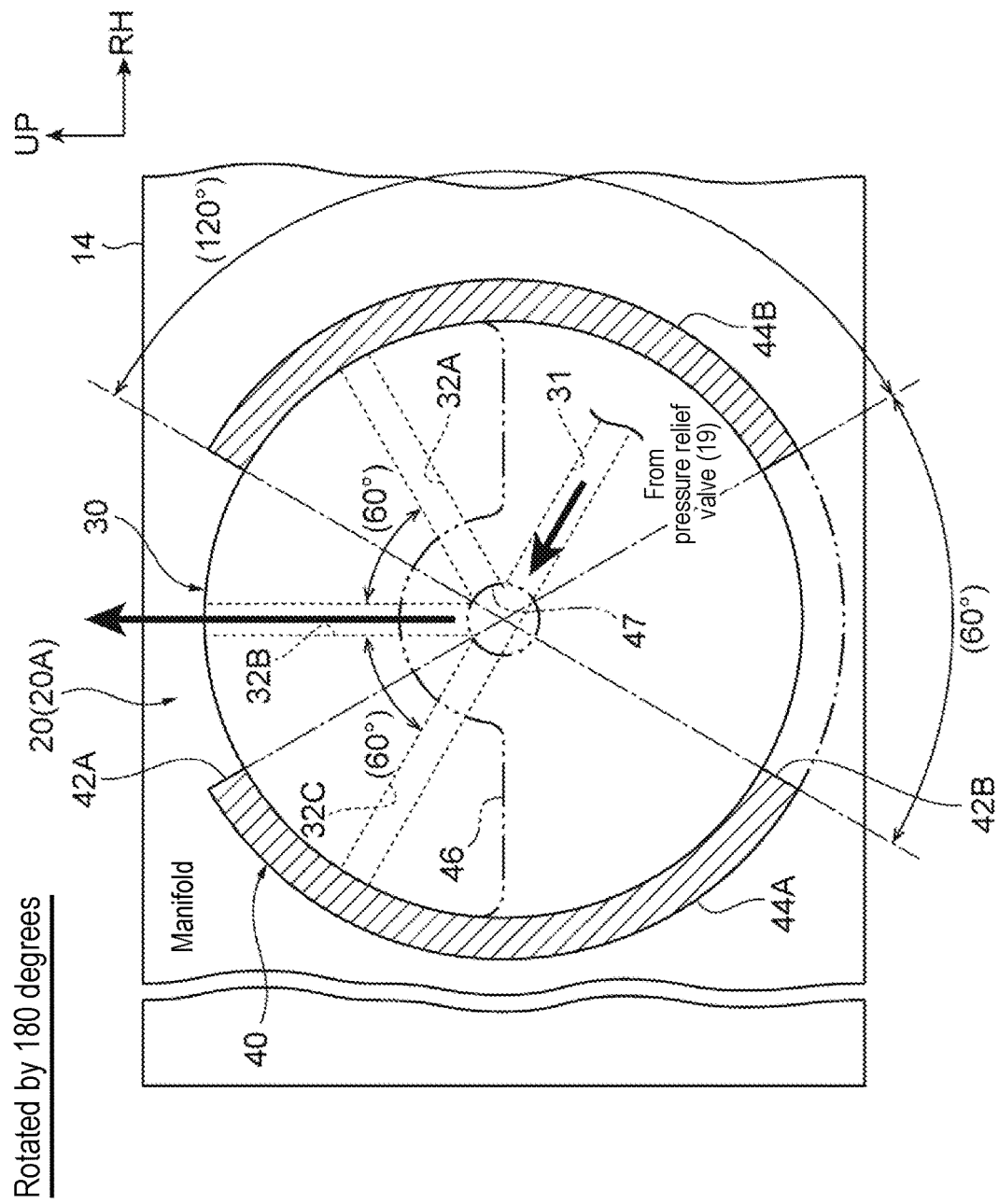
FIG. 9 is an enlarged cross-sectional view of the portion around the release direction control unit corresponding to FIG. 6, in a state where the pressure vessel (vehicle) is rotated by 180 degrees from the state shown in FIG. 6.

As shown in FIG. 9, when the vehicle 100 is rotated by 180 degrees, in the same manner, the projection portion 30 is rotated by 180 degrees, but the guide member 40 will not be rotated (the attitude with respect to the gravity direction will not change), resulting in rotational movement of the guide member 40 relative to the projection portion 30 (the relative relation between the projection portion 30 and the guide member 40 will change). In this case, out of the three release passages 32A, 32B, 32C of the projection portion 30, the release passage 32B in the middle now facing upward by rotation is opened through the upper release opening 42A, and the release passages 32C, 32A located on the opposite sides of the release passage 32B are closed by the right and left shield walls 44A, 44B, respectively.

It should be noted that when the vehicle 100 is rotated by about 150 degrees to about 210 degrees, the state of the projection portion 30 and the guide member 40 is equal to that shown in FIG. 9.

Figure 10:
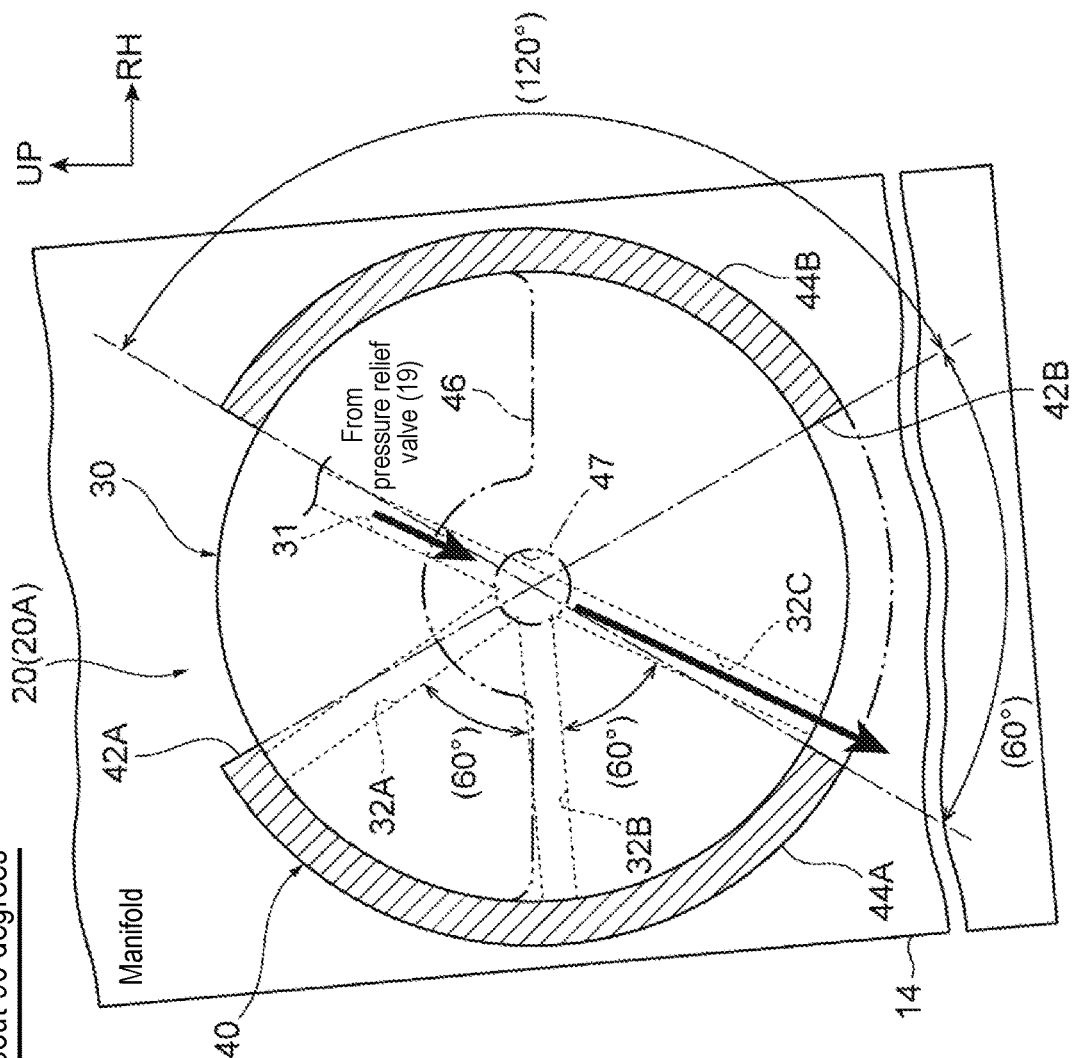
FIG. 10 is an enlarged cross-sectional view of the portion around the release direction control unit corresponding to FIG. 6, in a state where the pressure vessel (vehicle) is rotated in a clockwise direction by about 90 degrees from the state shown in FIG. 6.
Figure 11:
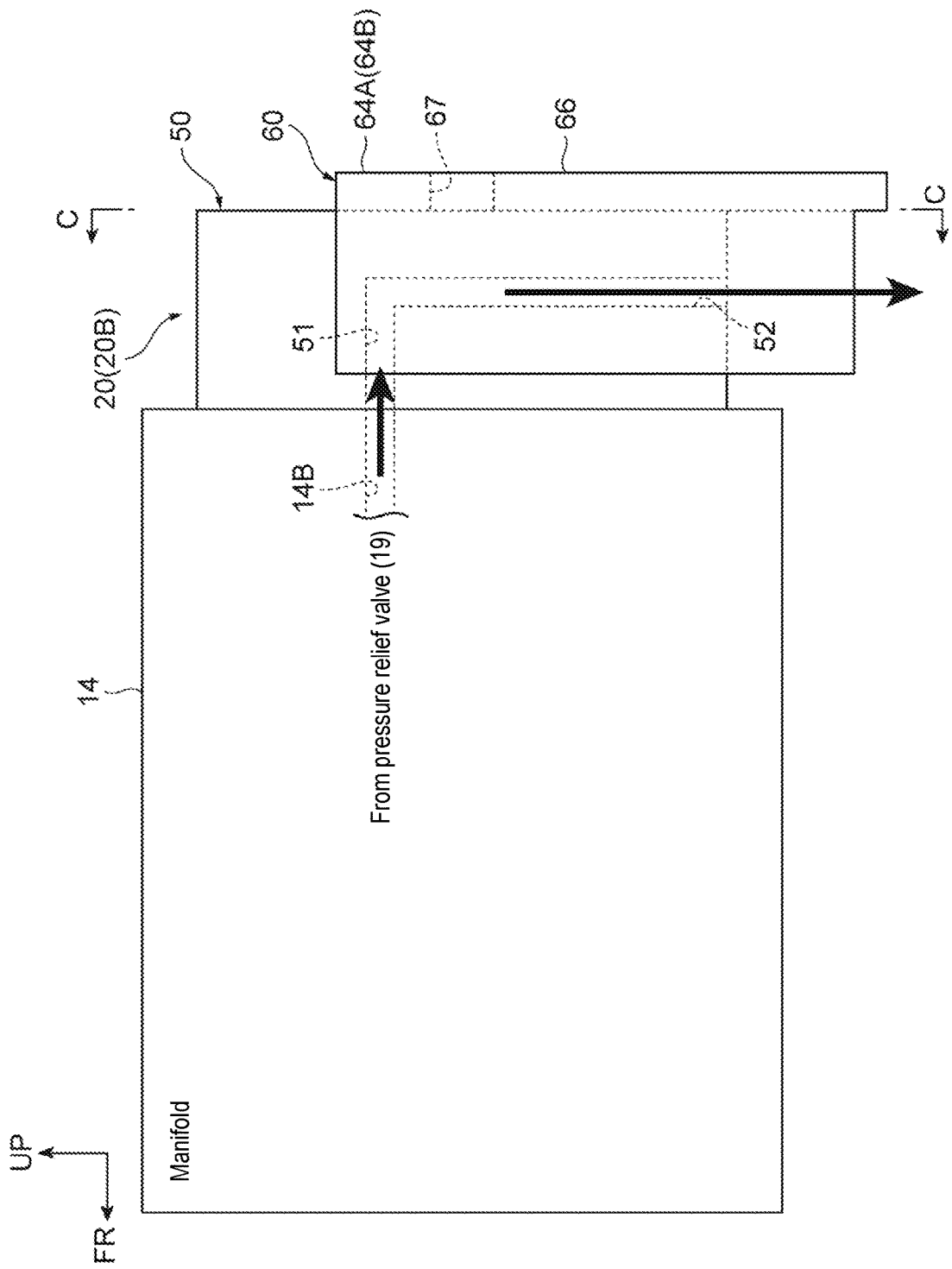
FIG. 11 is an enlarged cross-sectional view showing a portion around a release direction control unit cut along line A-A in FIG. 4 in an enlarged manner according to a second embodiment.

As shown in FIG. 10, when the vehicle 100 is rotated in a clockwise direction by slightly less than 90 degrees as viewed from the rear side, in the same manner, the projection portion 30 is rotated in a clockwise direction by slightly less than 90 degrees as viewed from the rear side, but the guide member 40 will not be rotated (the attitude with respect to the gravity direction will not change), resulting in rotational movement of the guide member 40 relative to the projection portion 30 (the relative relation between the projection portion 30 and the guide member 40 will change). In this case, out of the three release passages 32A, 32B, 32C of the projection portion 30, the release passage 32C now facing downward by rotation is opened through the lower release opening 42B, and the remaining release passages 32A, 32B are closed by the left shield wall 44A.

It should be noted that when the vehicle 100 is rotated in a clockwise direction by about 30 degrees to about 90 degrees as viewed from the rear side, the state of the projection portion 30 and the guide member 40 is equal to that shown in FIG. 10.

When the vehicle 100 is rotated in a clockwise direction by slightly more than 90 degrees to about 150 degrees as viewed from the rear side, out of the three release passages 32A, 32B, 32C of the projection portion 30, the release passage 32A now facing upward by rotation is opened through the upper release opening 42A, and the remaining release passages 32B, 32C are closed by the left shield wall 44A.

Consequently, when the temperature of the vehicle lower part becomes high because of fire or the like for example, and reaches a predetermined temperature or higher, the heat-sensitive portion of the pressure relief valve 19 melts and the discharge gas passage 14B is opened, thus communicating with the release passages 32A, 32B, 32C of the projection portion 30. In the present embodiment, without depending on the attitude of the vehicle 100, the guide member 40 is configured such that the upper and lower release openings 42A, 42B always face the release-permitted range (direction); the right and left shield walls 44A, 44B always face the release-restricted range (direction) (i.e., horizontal direction); the release passage facing the release-restricted range is closed by the shield walls 44A, 44B; and the release passage facing the release-permitted range is opened through the release openings 42A, 42B. Therefore, the gas in the pressure vessel 10 is first discharged from the discharge gas passage 14B and then released, not to the release-restricted range, but (only) to the release-permitted range (specifically, after passing through the release passage facing the release-permitted range, the gas is released to the outside of the case 2 via the release openings 42A, 42B).

It should be noted that in the present embodiment, although only one of the plurality of (three) release passages 32A, 32B, 32C is (always) opened through only one of the plurality of (two) release openings 42A, 42B, it is needless to mention that a plurality of release passages may be opened simultaneously or one or more release passages may be opened simultaneously through a plurality of release openings.

[Operational Effects of the First Embodiment]

As described above, in the first embodiment, the pressure vessel 10 (or the manifold 14 thereof) is provided with the projection portion 30 having a plurality of release passages for releasing the gas, and the guide member 40 is slidably mounted around the projection portion 30 and includes the shield walls 44A, 44B that come into sliding contact with the outer surface of the projection portion 30 and the release openings 42A, 42B for releasing the gas. When the attitude of the pressure vessel 10 changes, the guide member 40 is configured to move rotationally relative to the projection portion 30, close the release passage facing the release-restricted direction with the shield walls 44A, 44B, and open the release passage facing the release-permitted direction with the release openings 42A, 42B.

In addition, when the attitude of the pressure vessel 10 changes, the guide member 40 is configured to open (only) one release passage facing the release-permitted direction with the release openings 42A, 42B.

This allows controlling the release direction of the gas from the pressure relief valve 19 without depending on the attitude of the vehicle or the surrounding environment.

Second Embodiment of Release Direction Control Unit 20

With reference to FIG. 11 to FIG. 16, a configuration of the second embodiment of the release direction control unit 20 (hereinafter referred to as a release direction control unit 20B) provided on the manifold 14 of the pressure vessel 10 will be described.

As shown in the figures, the release direction control unit 20B of the present embodiment basically includes a projection portion 50 for forming a release passage and a guide member 60 for defining the release passage.

The projection portion 50 is a cylindrical structure provided on the rear side face of the manifold 14. It should be noted that the projection portion 50 may be formed integrally with the manifold 14 or may be formed as a separate component.

The projection portion 50 is provided with a communication passage 51 communicating with the downstream side (rear end portion) of the discharge gas passage 14B and extending to the center of the projection portion 50. The projection portion 50 is provided with one release passage 52 in a radial direction (radially) from the downstream side of the communication passage 51 (i.e., the center of the projection portion 50). The release passage 52 is provided so as to release the gas stored in the pressure vessel 10 to the outside of the case 2 as the pressure relief valve 19 opens. In addition, in the present embodiment, in a state where the attitude of the vehicle is maintained substantially horizontal, the release passage 52 is arranged along the downward direction of the vehicle (in the gravity direction).

Meanwhile, the guide member 60 is constituted of a substantially cylindrical body having a diameter slightly larger than that of the projection portion 50 (or the outside diameter thereof) and is mounted around the projection portion 50 (or the outer circumference thereof) with a gap, so as to be rotatable about the central axis of the projection portion 50. This gap is formed to have a size that allows the gas stored in the pressure vessel 10 to pass therethrough (this will be described later).

The guide member 60 includes (a pair of) upper and lower release openings 62A, 62B (i.e., the pair of upper and lower release openings 62A, 62B is formed by cutting out upper and lower portions of the cylindrical portion) and shield walls 64A, 64B, which are opposed to the outer circumference of the projection portion 50 and formed by the portions (a pair of right and left portions) between the pair of upper and lower release openings 62A, 62B. The release openings 62A, 62B are formed to correspond to the release-permitted range (direction) (FIG. 1 to FIG. 3) so as to release the gas to the release-permitted range. Meanwhile, the shield walls 64A, 64B are formed to correspond to the release-restricted range (direction) (FIG. 1 to FIG. 3) and to be opposed to the outer circumference of the projection portion 50, so as to block (prevent) release of gas to the release-restricted range.

In the illustrated embodiment, the upper release opening 62A is provided to have an angular range of approximately slightly less than 160 degrees (i.e., approximately 80 degrees on each of the right and left sides with respect to the vertical direction). The lower release opening 62B is provided to have an angular range of approximately 45 degrees (i.e., approximately 22.5 degrees on each of the right and left sides with respect to the vertical direction). Each of the right and left shield walls 64A, 64B is provided to have an angular range of approximately 77.5 degrees (i.e., approximately 10 degrees on the upper side and approximately 67.5 degrees on the lower side with the respect to the horizontal direction).

In addition, the guide member 60 includes protrusions 68A, 68B that protrude toward the projection portion 50 at the lower ends (or on the inner surface thereof) of the shield walls 64A, 64B. The protrusions 68A, 68B are provided so as to guide the gas discharged to the gap formed between the projection portion 50 (or the outer surface thereof) and the shield walls 64A, 64B (or the inner surface thereof) (only) to the upper release opening 62A out of the two release openings 62A, 62B via the gap and release the gas.

The right and left shield walls 64A, 64B are coupled together by a connection portion 66 disposed so as to be opposed to the rear side face of the projection portion 50. In the present embodiment, the connection portion 66 has a substantially semicircular shape and couples together the rear end portions of the right and left shield walls 64A, 64B (see in particular FIG. 13).

Figure 13:
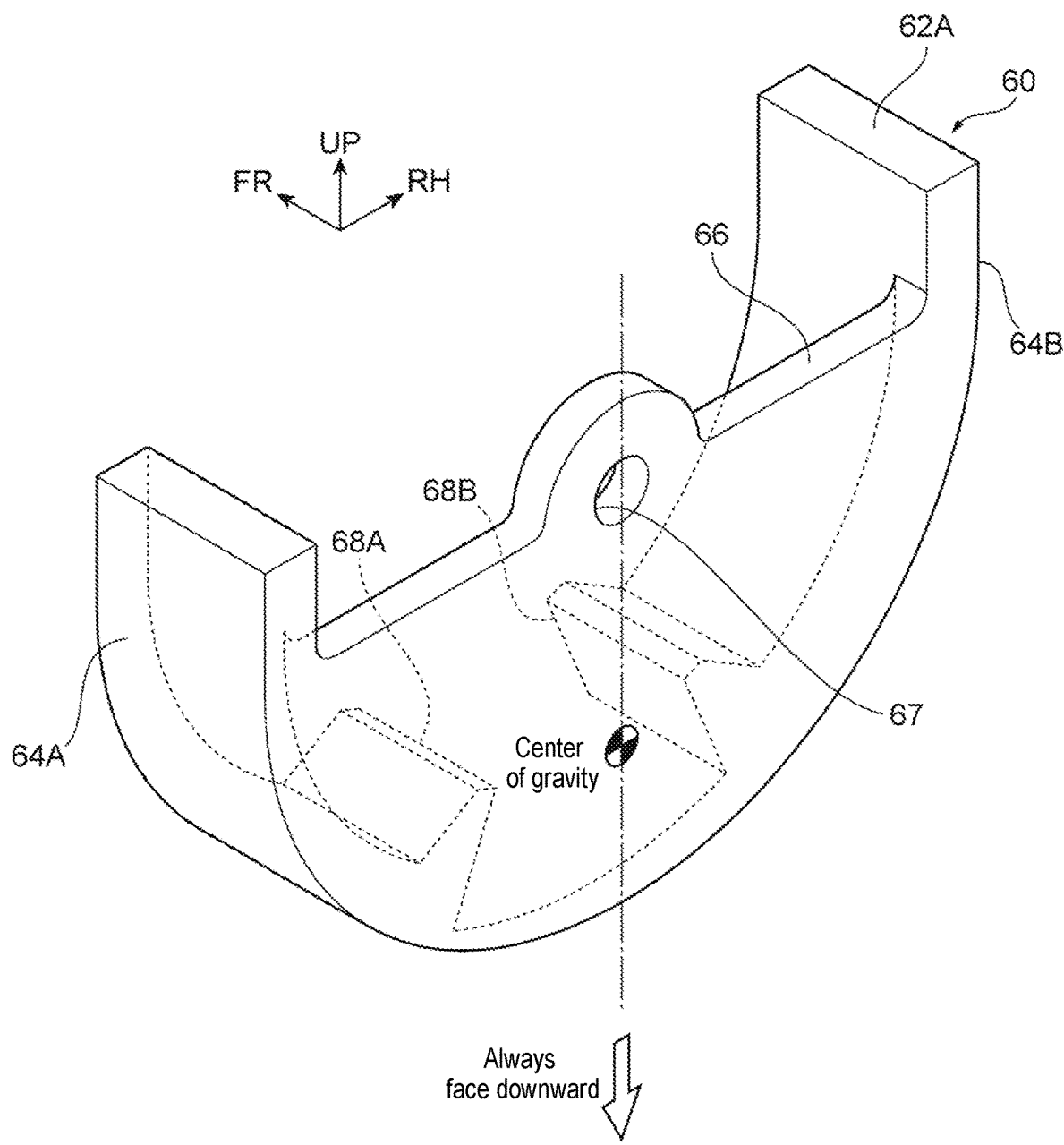
FIG. 13 is a perspective view showing a guide member of FIG. 12 in an enlarged manner.

In addition, an insertion hole 67 to which a support member (not shown) is inserted for rotatably supporting the guide member 60 on the projection portion 50 is formed at the center of the connection portion 66 (a portion corresponding to the center of the guide member 60 that is a substantially cylindrical body) (see in particular FIG. 13).

In the present embodiment, with the above-described configuration, the guide member 60 is configured such that the center of gravity is displaced downward (with respect to the center of rotation) (i.e., disposed eccentrically). Therefore, when the guide member 60 is rotatably supported on the projection portion 50 with the support member (not shown), even if the attitude of the vehicle 100 (i.e., the pressure vessel 10) changes (rotation or inclination), the guide member 60 moves rotationally relative to the projection portion 50 provided on the manifold 14 (more specifically, moves rotationally so as to offset the change in the attitude of the vehicle 100) such that the attitude with respect to the gravity direction will not change (will be maintained).

That is, the guide member 60 has the center of gravity such that the upper and lower release openings 62A, 62B always face the release-permitted range (direction) and the right and left shield walls 64A, 64B always face the release-restricted range (direction) (i.e., horizontal direction).

In other words, when the release passage 52 is facing the release-restricted direction, the guide member 60 is configured to block the gas to be released in the release-restricted direction through the release passage 52 with the shield walls 64A, 64B and change the release direction of the gas so as to release the gas from the upper release opening 62A via the gap formed between the projection portion 50 and the shield walls 64A, 64B (toward the outside of the case 2). When the release passage 52 is facing the release-permitted direction, the guide member 60 is configured to release the gas to be released in the release-permitted direction through the release passage 52 from the lower release opening 62B or the upper release opening 62A (toward the outside of the case 2) not via the gap.

Figure 12:
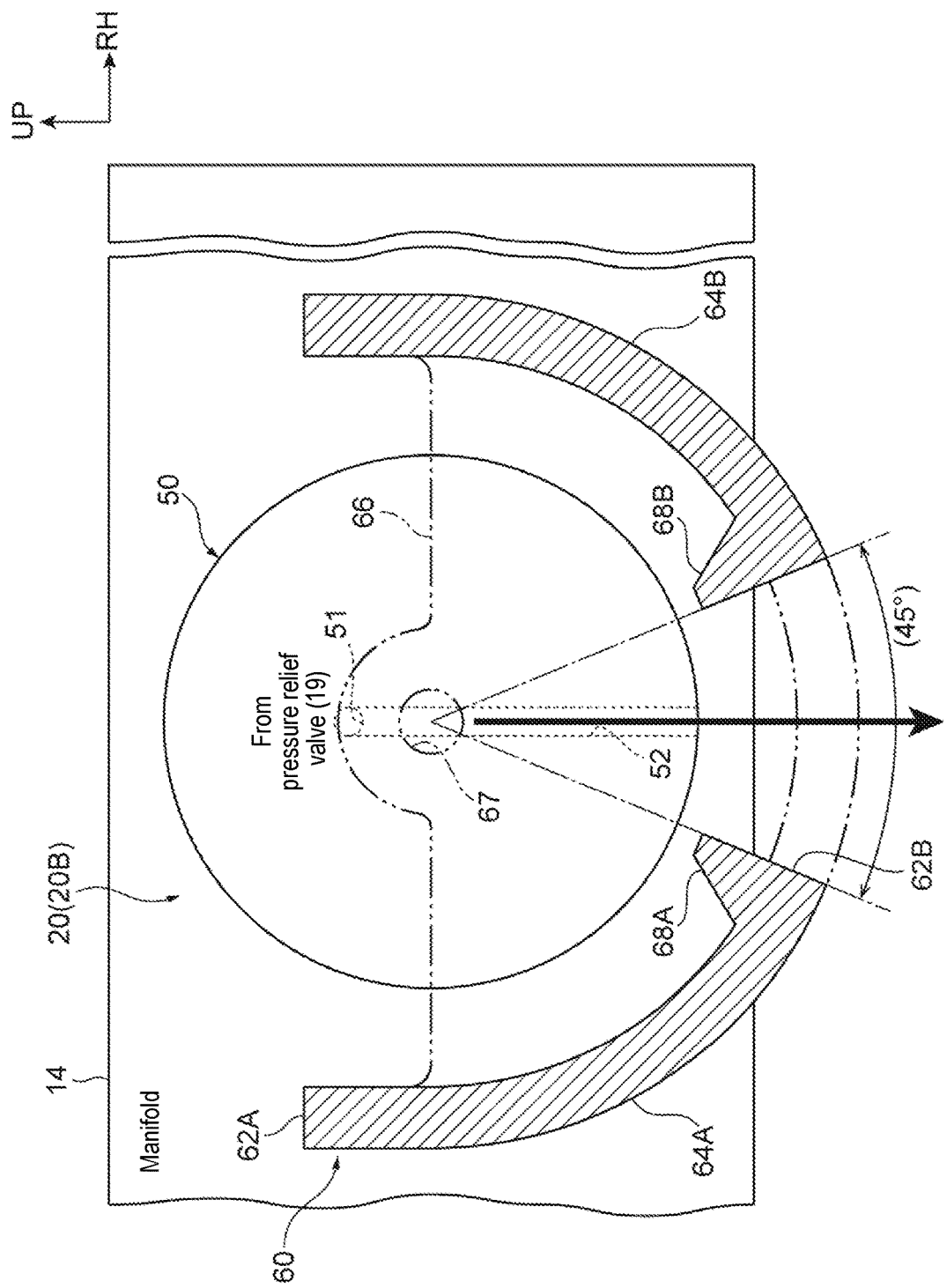
FIG. 12 is an enlarged cross-sectional view showing the portion around the release direction control unit cut along line C-C in FIG. 11.

Specifically, as shown in FIG. 12, when the vehicle 100 is not rotated (roll rotation in this example, the same applies hereinafter), the guide member 60 will not move rotationally relative to the projection portion 50 (the relative relation between the projection portion 50 and the guide member 60 will not change). In this case, the gas to be released through the downward release passage 52 of the projection portion 50 is released via the lower release opening 62B.

It should be noted that when the vehicle 100 is rotated in a counterclockwise or clockwise direction by about 22.5 degrees as viewed from the rear side, the state of the projection portion 50 and the guide member 60 is equal to that shown in FIG. 12.

Figure 14:
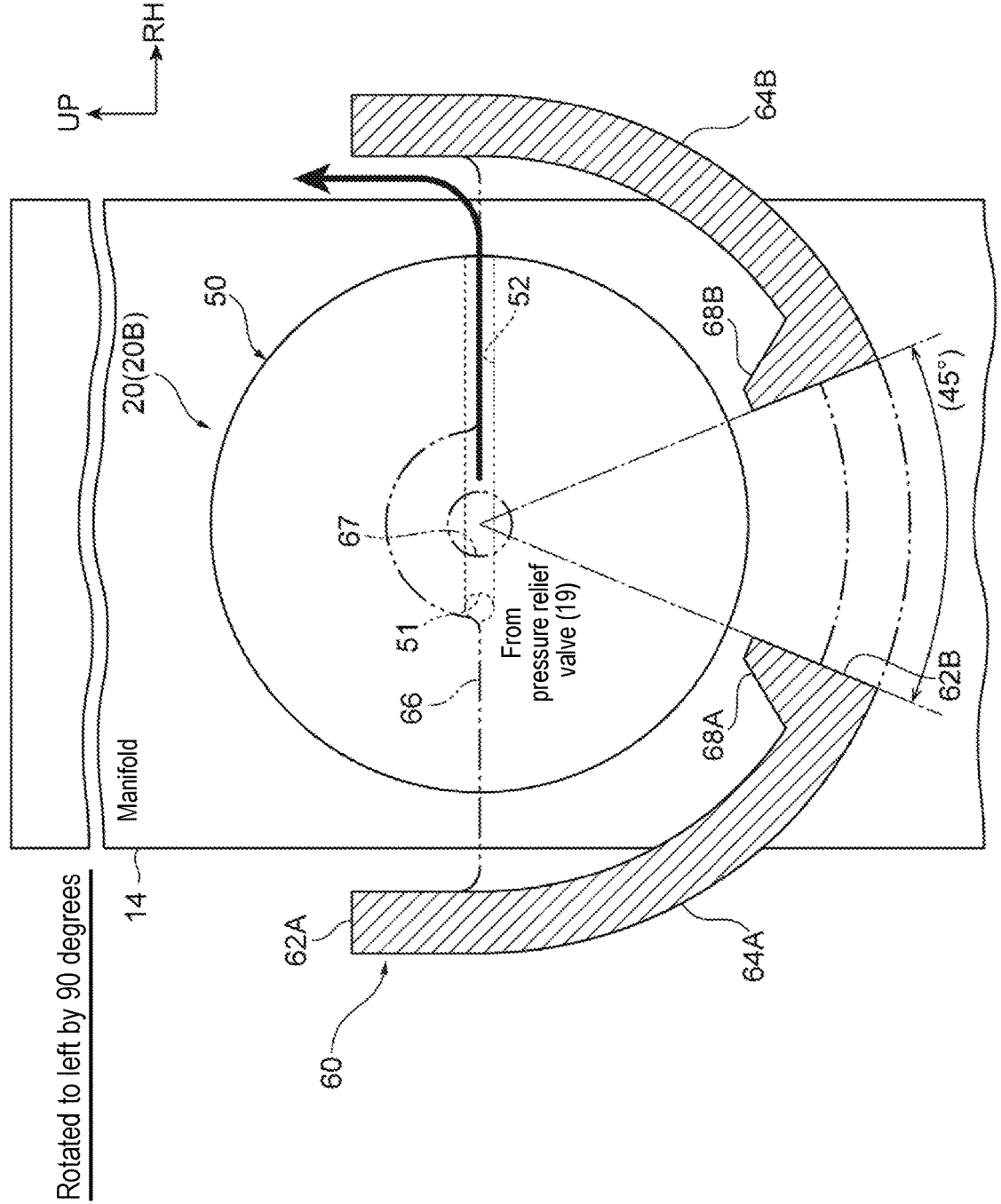
FIG. 14 is an enlarged cross-sectional view of the portion around the release direction control unit corresponding to FIG. 12, in a state where the pressure vessel (vehicle) is rotated in a counterclockwise direction by 90 degrees from the state shown in FIG. 12.

As shown in FIG. 14, when the vehicle 100 is rotated in a counterclockwise direction by about 90 degrees as viewed from the rear side, in the same manner, the projection portion 50 is rotated in a counterclockwise direction by about 90 degrees as viewed from the rear side, but the guide member 60 will not be rotated (the attitude with respect to the gravity direction will not change), resulting in rotational movement of the guide member 60 relative to the projection portion 50 (the relative relation between the projection portion 50 and the guide member 60 will change). In this case, the gas to be released through the release passage 52 now facing rightward by rotation collides with the right shield wall 64B and changes its direction to the upward direction (i.e., the gas is blocked), and then is guided to the upper release opening 62A and released via the gap formed between the projection portion 50 and the shield wall 64B (toward the outside of the case 2).

It should be noted that when the vehicle 100 is rotated in a counterclockwise direction by about 22.5 degrees to about 100 degrees as viewed from the rear side, the state of the projection portion 50 and the guide member 60 is equal to that shown in FIG. 14.

Figure 15:
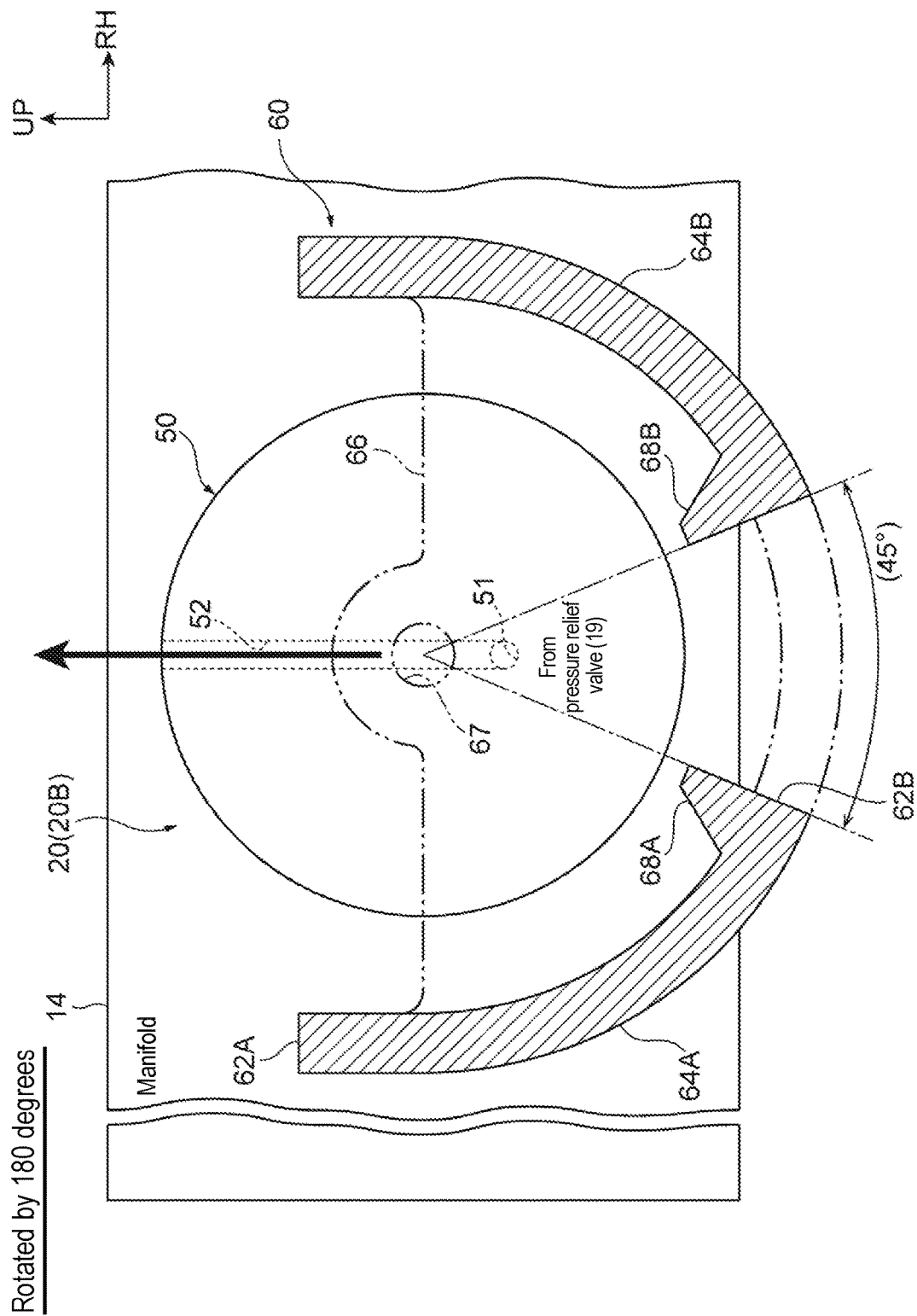
FIG. 15 is an enlarged cross-sectional view of the portion around the release direction control unit corresponding to FIG. 12, in a state where the pressure vessel (vehicle) is rotated by 180 degrees from the state shown in FIG. 12.

As shown in FIG. 15, when the vehicle 100 is rotated by 180 degrees, in the same manner, the projection portion 50 is rotated by 180 degrees, but the guide member 60 will not be rotated (the attitude with respect to the gravity direction will not change), resulting in rotational movement of the guide member 60 relative to the projection portion 50 (the relative relation between the projection portion 50 and the guide member 60 will change). In this case, the gas to be released through the release passage 52 now facing upward by rotation is released via the upper release opening 62A.

It should be noted that when the vehicle 100 is rotated by about 100 degrees to about 260 degrees, the state of the projection portion 50 and the guide member 60 is equal to that shown in FIG. 15.

Figure 16:
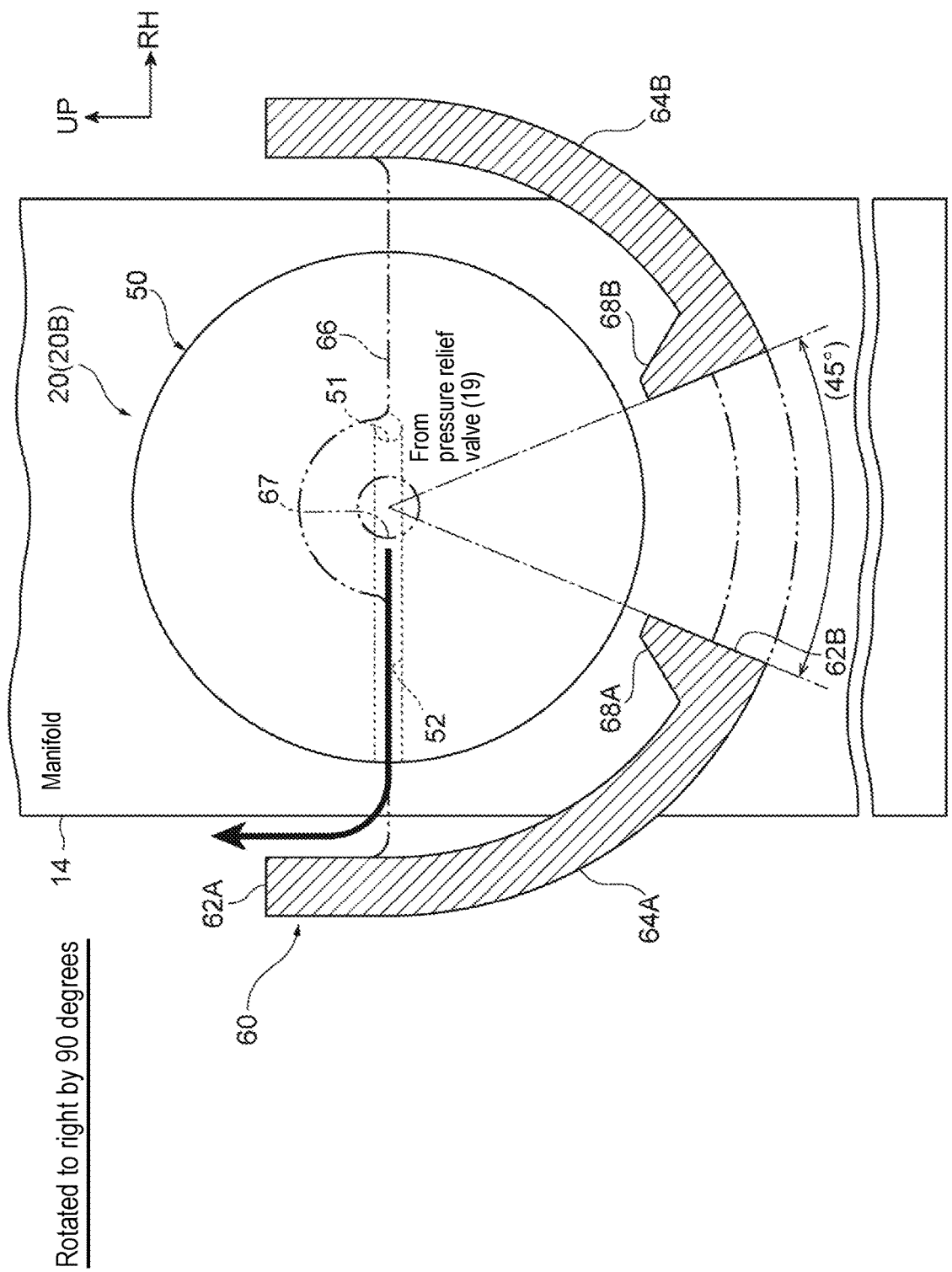
FIG. 16 is an enlarged cross-sectional view of the portion around the release direction control unit corresponding to FIG. 12, in a state where the pressure vessel (vehicle) is rotated in a clockwise direction by 90 degrees from the state shown in FIG. 12.
Figure 17:
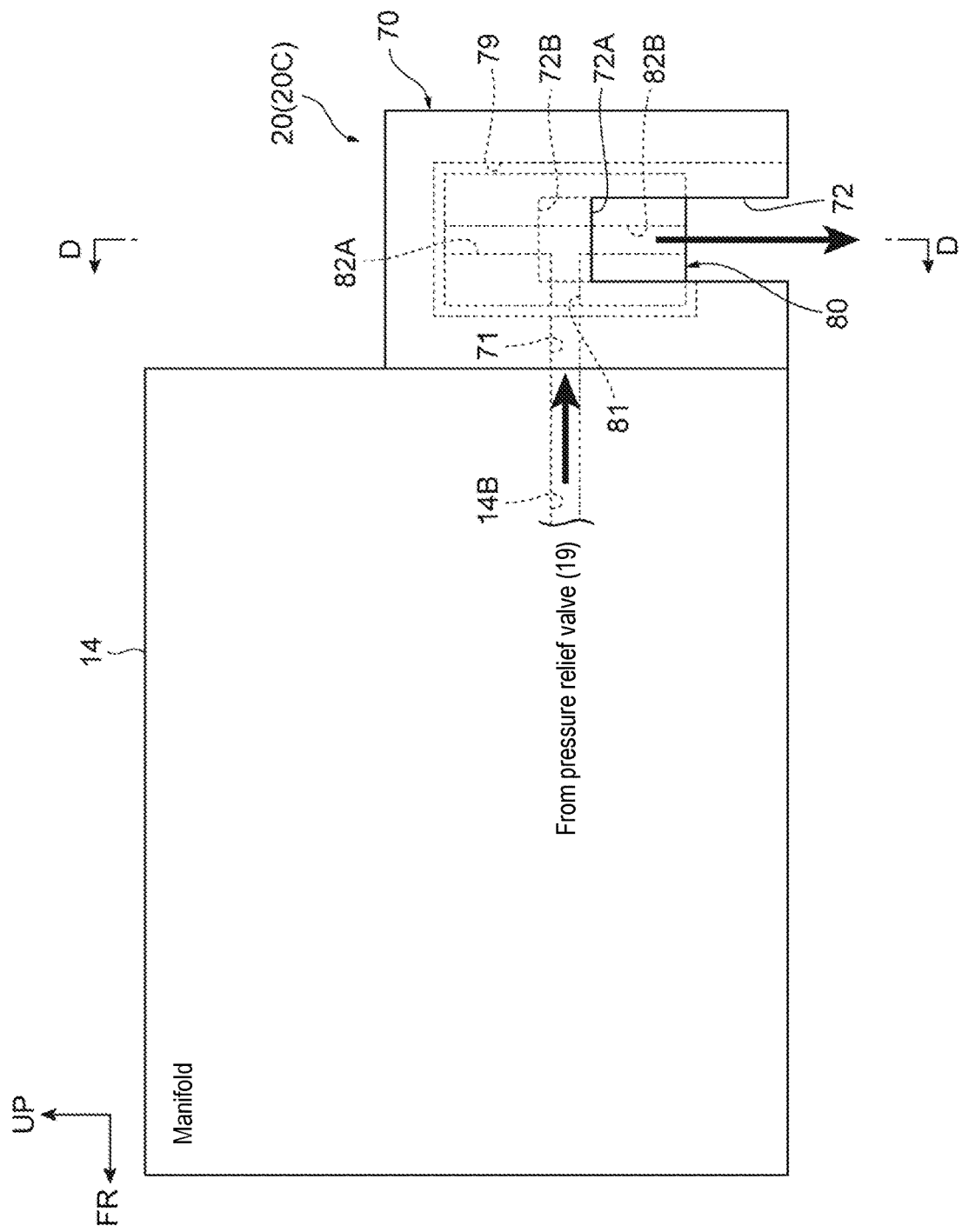
FIG. 17 is an enlarged cross-sectional view showing a portion around a release direction control unit cut along line A-A in FIG. 4 in an enlarged manner according to a third embodiment.

As shown in FIG. 16, when the vehicle 100 is rotated in a clockwise direction by about 90 degrees as viewed from the rear side, in the same manner, the projection portion 50 is rotated in a clockwise direction by about 90 degrees as viewed from the rear side, but the guide member 60 will not be rotated (the attitude with respect to the gravity direction will not change), resulting in rotational movement of the guide member 60 relative to the projection portion 50 (the relative relation between the projection portion 50 and the guide member 60 will change). In this case, the gas to be released through the release passage 52 now facing leftward by rotation collides with the left shield wall 64A and changes its direction to the upward direction (i.e., the gas is blocked), and then is guided to the upper release opening 62A and released via the gap formed between the projection portion 50 and the shield wall 64A (toward the outside of the case 2).

It should be noted that when the vehicle 100 is rotated in a clockwise direction by about 22.5 degrees to about 100 degrees as viewed from the rear side, the state of the projection portion 50 and the guide member 60 is equal to that shown in FIG. 16.

Consequently, when the temperature of the vehicle lower part becomes high because of fire or the like for example, and reaches a predetermined temperature or higher, the heat-sensitive portion of the pressure relief valve 19 melts and the discharge gas passage 14B is opened, thus communicating with the release passage 52 of the projection portion 50. In the present embodiment, without depending on the attitude of the vehicle 100, the guide member 60 is configured such that the upper and lower release openings 62A, 62B always face the release-permitted range (direction); the right and left shield walls 64A, 64B always face the release-restricted range (direction) (i.e., horizontal direction); the gas to be released through the release passage 52 facing the release-restricted range is blocked by the shield walls 64A, 64B and guided to and released from the upper release opening 62A; and the gas to be released through the release passage 52 facing the release-permitted range is directly released from the upper release opening 62A or the lower release opening 62B. Therefore, the gas in the pressure vessel 10 is first discharged from the discharge gas passage 14B and then released, not to the release-restricted range, but (only) to the release-permitted range (specifically, released to the outside of the case 2 via the release openings 62A, 62B facing the release-permitted range).

It should be noted that in the present embodiment, although the gas to be released through the release passage 52 facing the release-restricted range is blocked by the shield walls 64A, 64B and guided only to the upper release opening 62A, the gas may be guided only to the lower release opening 62B or may be guided to either the upper release opening 62A or the lower release opening 62B by changing the positions of the protrusions 68A, 68B, for example.

[Operational Effects of the Second Embodiment]

As described above, in the second embodiment, the pressure vessel 10 (or the manifold 14 thereof) is provided with the projection portion 50 having at least one release passage for releasing the gas, and the guide member 60 is mounted around the projection portion 50 with a gap that allows the gas to pass therethrough, and includes the shield walls 64A, 64B that are opposed to the outer surface of the projection portion 50 and the release openings 62A, 62B for releasing the gas. When the attitude of the pressure vessel 10 changes, the guide member 60 is configured to move rotationally relative to the projection portion 50. When the release passage is facing the release-restricted direction, the guide member 60 is configured to block the gas to be released in the release-restricted direction through the release passage with the shield walls 64A, 64B and release the gas from the release openings 62A, 62B via the gap formed between the projection portion 50 and the shield walls 64A, 64B. When the release passage is facing the release-permitted direction, the guide member 60 is configured to release the gas to be released in the release-permitted direction through the release passage from the release openings 62A, 62B not via the gap.

In addition, the guide member 60 is provided with the plurality of release openings 62A, 62B, and the shield walls 64A, 64B are respectively provided with the protrusions 68A, 68B for releasing the gas to be released in the release-restricted direction through the release passage from (only) one of the plurality of release openings 62A, 62B via the gap formed between the projection portion 50 and the shield walls 64A, 64B (i.e., the protrusions 68A, 68B for guiding the gas to one release opening).

This allows controlling the release direction of the gas from the pressure relief valve 19 without depending on the attitude of the vehicle or the surrounding environment.

Since the projection portion 50 for forming a release passage need only include at least one release passage 52, the second embodiment can produce advantageous effects of simplifying the configuration of the projection portion 50 and reducing the production cost, as compared to the first embodiment that forms a plurality of release passages, for example.

Third Embodiment of Release Direction Control Unit 20

With reference to FIG. 17 to FIG. 22, a configuration of the third embodiment of the release direction control unit 20

(hereinafter referred to as a release direction control unit 20C) provided on the manifold 14 of the pressure vessel 10 will be described.

As shown in the figures, the release direction control unit 20C of the present embodiment basically includes a housing portion 70 as a storage portion for storing a guide member and for defining a release passage and a guide member 80 for forming the release passage.

The housing portion 70 is provided on the rear side face of the manifold 14. It should be noted that the housing portion 70 may be formed integrally with the manifold 14 or may be formed as a separate component.

The housing portion 70 is provided with a cylindrical storage chamber 79. The storage chamber 79 (the center thereof in this example) is coupled (communicated) to the downstream side (rear end portion) of the discharge gas passage 14B via a communication passage 71. A substantially lower half portion of the storage chamber 79 is open to the outside of the case 2 via an open space 72.

Meanwhile, the guide member 80 is constituted of a substantially cylindrical body and is stored (mounted) so as to be able to rotatably slide inside of the storage chamber 79, so as to be rotatable about the central axis of the storage chamber 79.

The guide member 80 is provided with a communication passage 81 communicating with the downstream side (rear end portion) of the discharge gas passage 14B and extending to the center of the projection portion 80 via the communication passage 71 of the housing portion 70. The guide member 80 is provided with a plurality of (two in the illustrated example) release passages 82A, 82B branching from the downstream side (i.e., the center of the guide member 80) of this communication passage 81. The two release passages 82A, 82B are provided so as to release the gas stored in the pressure vessel 10 to the outside of the case 2 as the pressure relief valve 19 opens. In the present embodiment, the two release passages 82A, 82B are formed to extend in a radial direction (radially) from the center and at angle intervals of approximately 180 degrees (i.e., to extend toward the opposite sides in the radial direction). In addition, in the present embodiment, in a state where the attitude of the vehicle is maintained substantially horizontal, the release passage 82B, which is one of the two release passages 82A, 82B, is arranged along the downward direction of the vehicle (in the gravity direction) and the release passage 82A, which is the other one of the release passages 82A, 82B, is arranged along the upward direction of the vehicle.

Here, in the present embodiment, the open space 72 of the housing portion 70 is formed to have a size that opens only one of the two release passages 82A, 82B and closes the other one of the two release passages 82A, 82B with the inner wall forming the storage chamber 79 when the guide member 80 makes a relative rotational movement in the storage chamber 79.

In the illustrated embodiment, the open space 72 is defined by end portions 72A, 72B (on the opposite sides in the radial direction) of the housing portion 70. With respect to a plane running through the center of the storage chamber 79, the end portion 72A (on the left side in the illustrated example), which is one of the end portions 72A, 72B, is formed to overhang downward, and the end portion 72B (on the right side in the illustrated example), which is the other one of the end portions 72A, 72B, is formed to be recessed in the upward direction. This can open only one of the two release passages 82A, 82B and closes the other one of the two release passages 82A, 82B with the inner wall forming the storage chamber 79, as described above.

In the present embodiment, even if the attitude of the vehicle 100 (i.e., the pressure vessel 10) changes (rotation or inclination), the guide member 80 in a state of being stored in the storage chamber 79 moves rotationally relative to the housing portion 70 (storage chamber 79) of the manifold 14 (more specifically, moves rotationally so as to offset the change in the attitude of the vehicle 100) such that the attitude with respect to the gravity direction will not change (will be maintained). However, the guide member 80 may have the center of gravity displaced downward (with respect to the center of rotation) (i.e., disposed eccentrically), for example, and move rotationally relative to the housing portion 70 (storage chamber 79) of the manifold 14 such that the attitude with respect to the gravity direction will not change (will be maintained) even if the attitude of the vehicle 100 (i.e., the pressure vessel 10) changes (rotation or inclination) (see the first and second embodiments).

That is, the guide member 80 has the center of gravity such that the release passages 82A, 82B formed in the up-down direction always face the release-permitted range (direction).

This means that the guide member 80 is configured such that (only) one of the release passages 82A, 82B (facing the release-permitted range) formed in the up-down direction is (always) open via the open space 72 of the housing portion 70.

Figure 18:
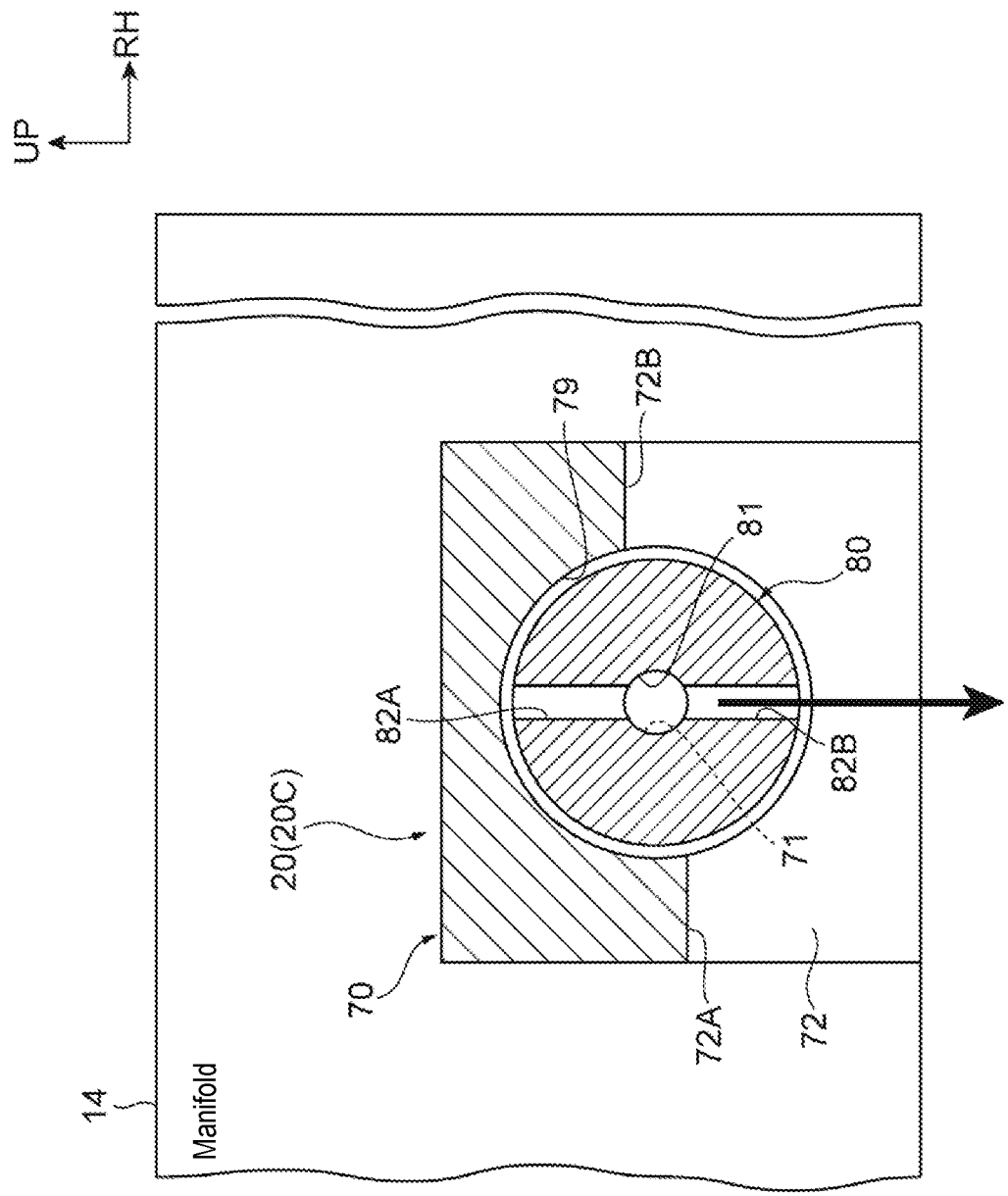
FIG. 18 is an enlarged cross-sectional view showing the portion around the release direction control unit cut along line D-D in FIG. 17.
Figure 19:
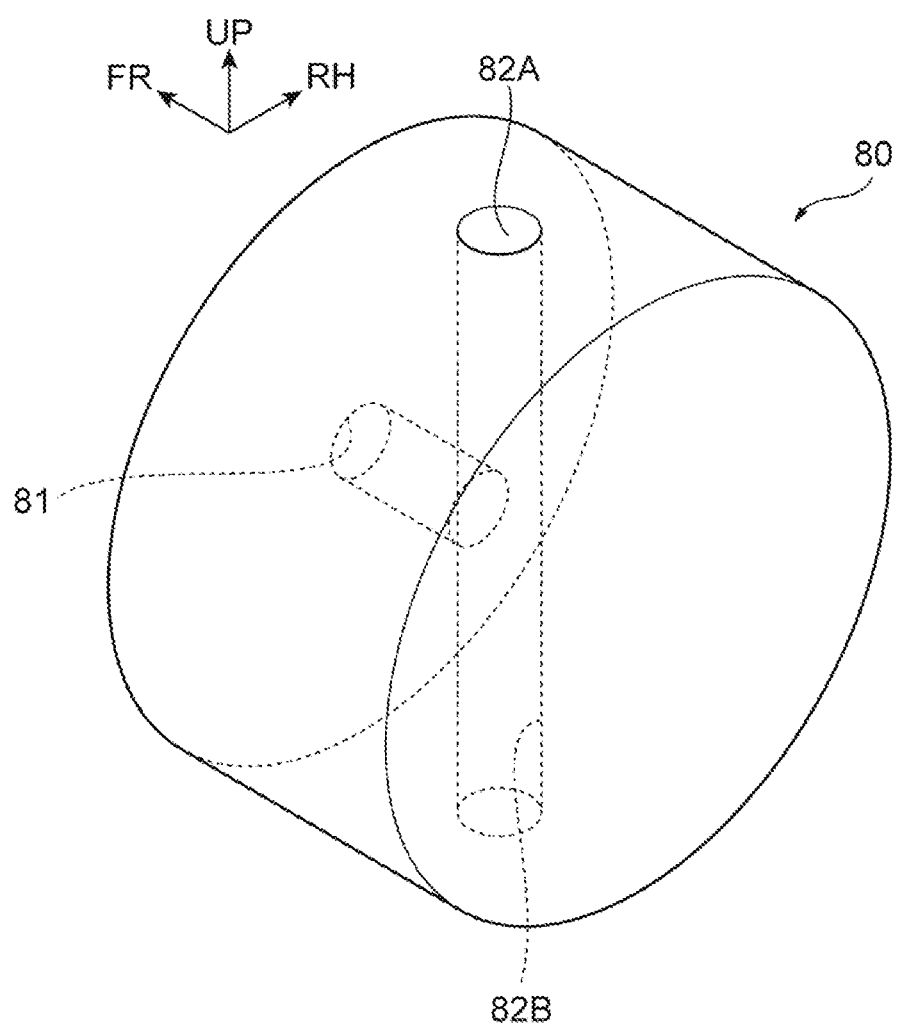
FIG. 19 is a perspective view showing a guide member of FIG. 18 in an enlarged manner.

Specifically, as shown in FIG. 18, when the vehicle 100 is not rotated (roll rotation in this example, the same applies hereinafter), the guide member 80 will not move rotationally relative to the housing portion 70 (storage chamber 79) (the relative relation between the housing portion 70 and the guide member 80 will not change). In this case, out of the two release passages 82A, 82B of the guide member 80, the release passage 82B along the downward direction of the vehicle is opened via the open space 72 and the release passage 82A along the upward direction of the vehicle is closed by the inner wall forming the storage chamber 79.

Figure 22:
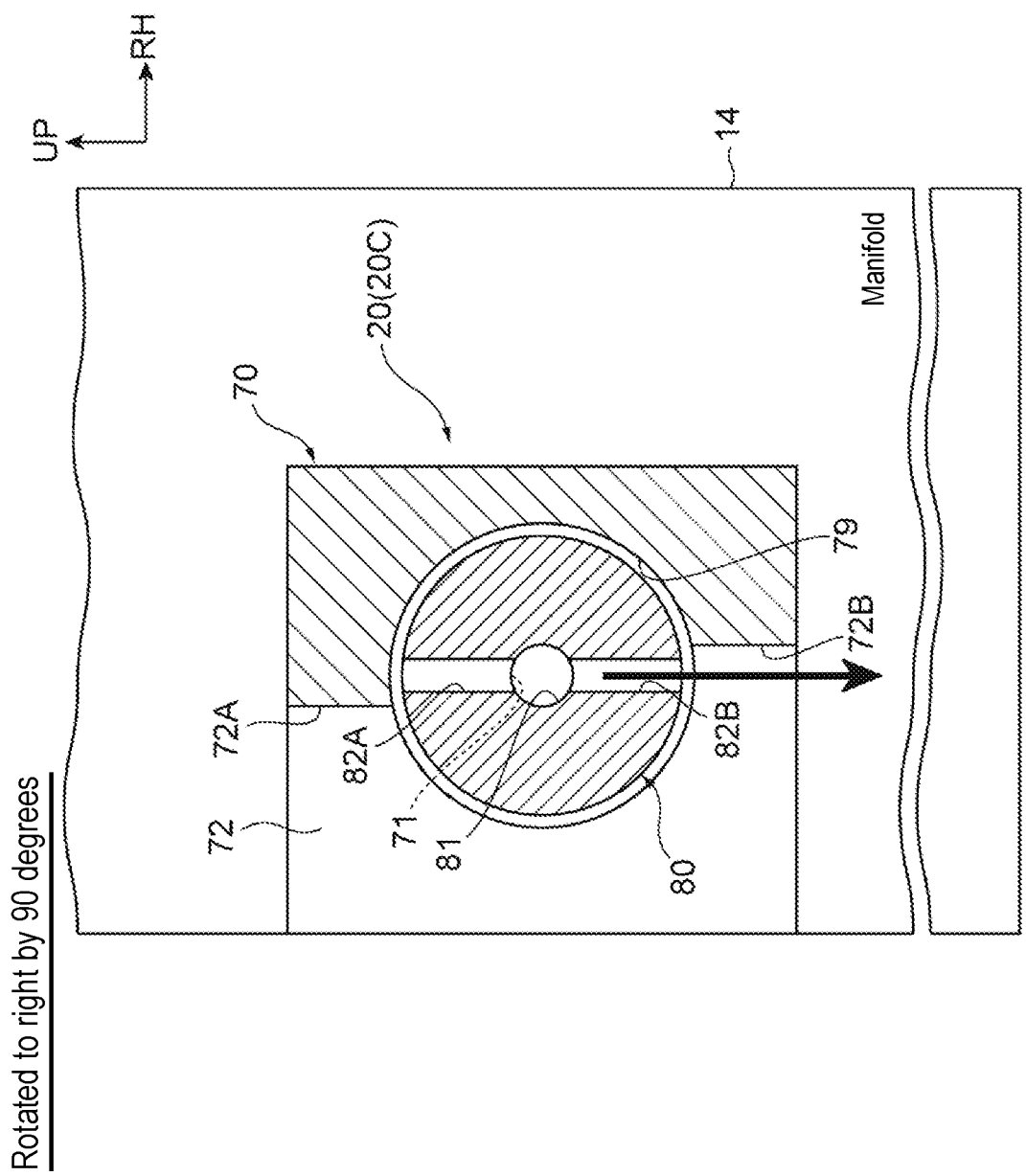
FIG. 22 is an enlarged cross-sectional view of the portion around the release direction control unit corresponding to FIG. 18, in a state where the pressure vessel (vehicle) is rotated in a clockwise direction by 90 degrees from the state shown in FIG. 18.

As shown in FIG. 22, when the vehicle 100 is rotated in a clockwise direction by about 90 degrees as viewed from the rear side, in the same manner, the housing portion 70 is rotated in a clockwise direction by about 90 degrees as viewed from the rear side, but the guide member 80 will not be rotated (the attitude with respect to the gravity direction will not change), resulting in rotational movement of the guide member 80 relative to the housing portion 70 (the relative relation between the housing portion 70 and the guide member 80 will change). In this case, however, in the same manner as the state shown in FIG. 18, out of the two release passages 82A, 82B of the guide member 80, the release passage 82B along the downward direction of the vehicle is opened via the open space 72 and the release passage 82A along the upward direction of the vehicle is closed by the inner wall forming the storage chamber 79.

It should be noted that when the vehicle 100 is rotated in a counterclockwise direction by slightly less than 90 degrees as viewed from the rear side or when the vehicle 100 is rotated in a clockwise direction by about 90 degrees as viewed from the rear side, the state of the housing portion 70 and the guide member 80 is equal to that shown in FIG. 18 and FIG. 22.

Figure 21:
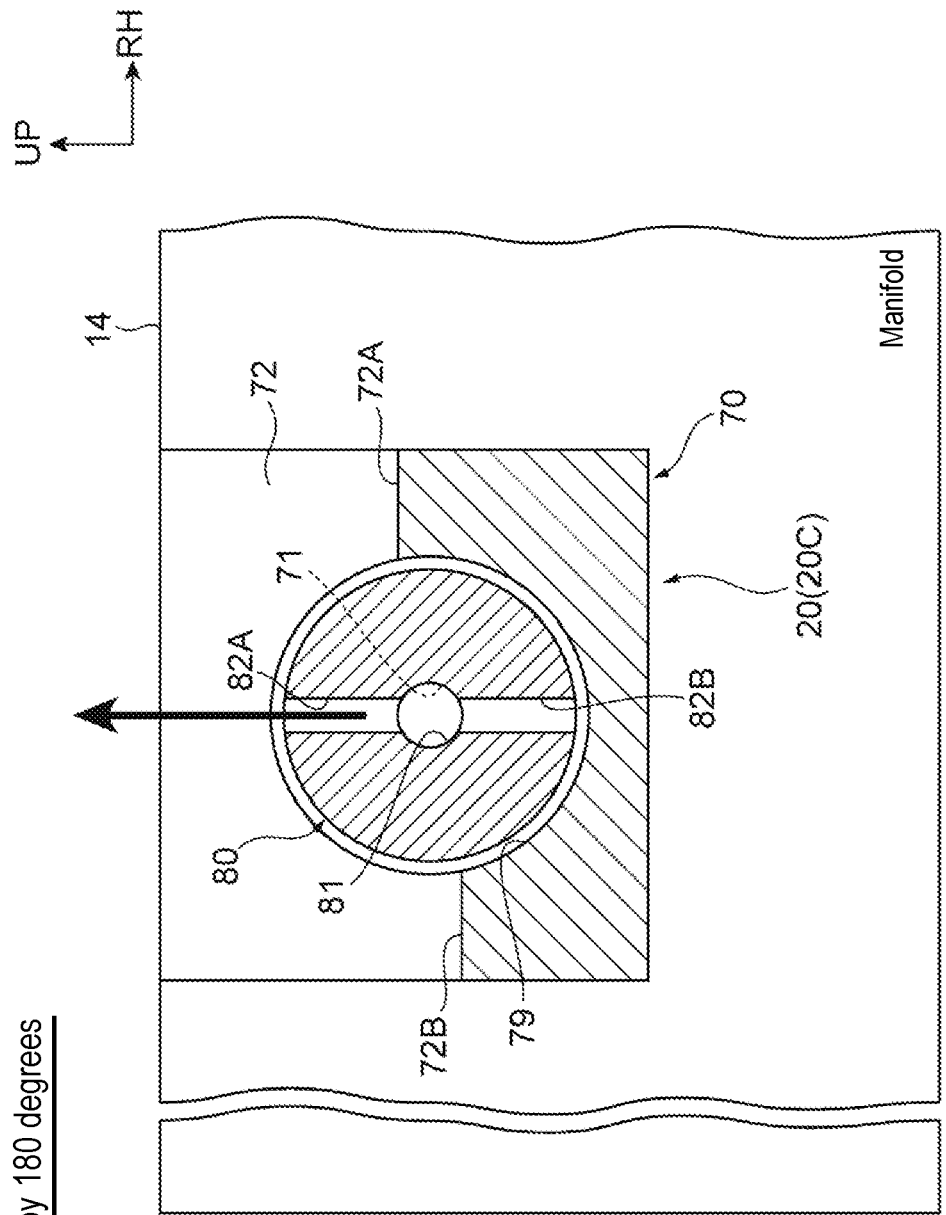
FIG. 21 is an enlarged cross-sectional view of the portion around the release direction control unit corresponding to FIG. 18, in a state where the pressure vessel (vehicle) is rotated by 180 degrees from the state shown in FIG. 18.

As shown in FIG. 21, when the vehicle 100 is rotated by 180 degrees, in the same manner, the housing portion 70 is rotated by 180 degrees, but the guide member 80 will not be rotated (the attitude with respect to the gravity direction will not change), resulting in rotational movement of the guide member 80 relative to the housing portion 70 (the relative relation between the housing portion 70 and the guide member 80 will change). In this case, out of the two release passages 82A, 82B of the guide member 80, the release passage 82A along the upward direction of the vehicle is opened via the open space 72 and the release passage 82B along the downward direction of the vehicle is closed by the inner wall forming the storage chamber 79.

Figure 20:
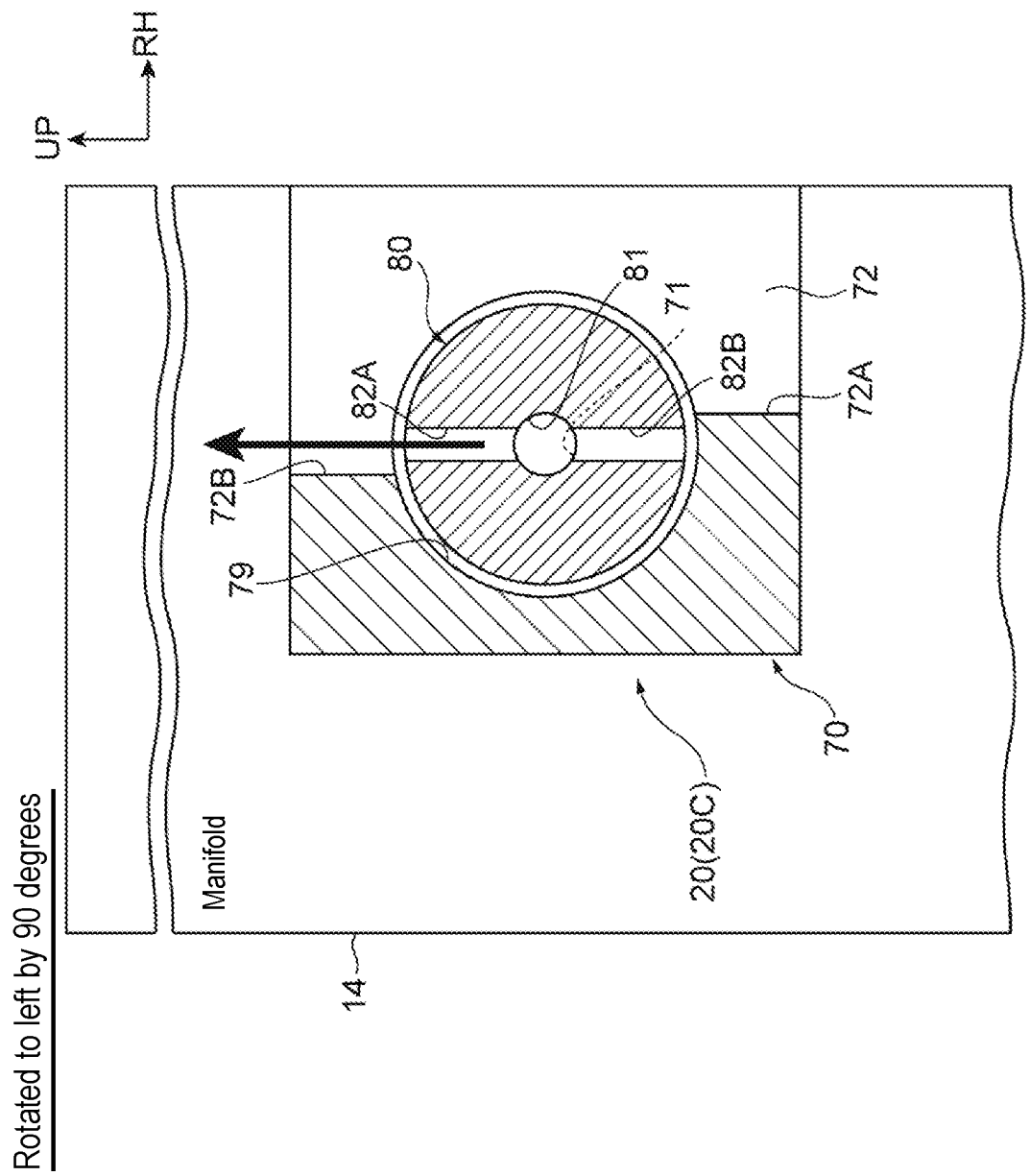
FIG. 20 is an enlarged cross-sectional view of the portion around the release direction control unit corresponding to FIG. 18, in a state where the pressure vessel (vehicle) is rotated in a counterclockwise direction by 90 degrees from the state shown in FIG. 18.

As shown in FIG. 20, when the vehicle 100 is rotated in a counterclockwise direction by about 90 degrees as viewed from the rear side, in the same manner, the housing portion 70 is rotated in a counterclockwise direction by about 90 degrees as viewed from the rear side, but the guide member 80 will not be rotated (the attitude with respect to the gravity direction will not change), resulting in rotational movement of the guide member 80 relative to the housing portion 70 (the relative relation between the housing portion 70 and the guide member 80 will change). In this case, however, in the same manner as the state shown in FIG. 21, out of the two release passages 82A, 82B of the guide member 80, the release passage 82A along the upward direction of the vehicle is opened via the open space 72 and the release passage 82B along the downward direction of the vehicle is closed by the inner wall forming the storage chamber 79.

It should be noted that when the vehicle 100 is rotated in a counterclockwise direction by about 90 degrees to about 180 degrees as viewed from the rear side or when the vehicle 100 is rotated in a clockwise direction by slightly more than 90 degrees to about 180 degrees as viewed from the rear side, the state of the housing portion 70 and the guide member 80 is equal to that shown in FIG. 20 and FIG. 21.

Consequently, when the temperature of the vehicle lower part becomes high because of fire or the like for example, and reaches a predetermined temperature or higher, the heat-sensitive portion of the pressure relief valve 19 melts and the discharge gas passage 14B is opened, thus communicating with the release passages 82A, 82B of the guide member 80. In the present embodiment, without depending on the attitude of the vehicle 100, the guide member 80 is configured such that the release passages 82A, 82B formed in the up-down direction always face the release-permitted range (direction) and (only) one of the release passages 82A, 82B (facing the release-permitted range) formed in the up-down direction is (always) open via the open space 72 of the housing portion 70. Therefore, the gas in the pressure vessel 10 is first discharged from the discharge gas passage 14B and then released, not to the release-restricted range, but (only) to the release-permitted range (specifically, after passing through the release passage facing the release-permitted range, the gas is released to the outside of the case 2 through the open space 72).

It should be noted that in the present embodiment, although only one of the two release passages 82A, 82B is opened via the open space 72 of the housing portion 70 and the other one of the two release passages 82A, 82B is closed by the inner wall forming the storage chamber 79, it is needless to mention that the two release passages 82A, 82B may be opened simultaneously (i.e., the gas may be released upward and downward simultaneously) by changing the shape of the open space 72, for example.

[Operational Effects of the Third Embodiment]

As described above, in the third embodiment, the pressure vessel 10 is provided with the storage portion (housing portion) 70 including the storage chamber 79 that is open to the outside via the open space 72, and the guide member 80 is rotatably stored in the storage chamber 79 of the storage portion 70 and includes the plurality of release passages for releasing the gas. When the attitude of the pressure vessel 10 changes, the guide member 80 is configured to move rotationally relative to the storage portion 70 and open the release passage facing the release-permitted direction via the open space 72.

The open space 72 is configured such that (only) one of the plurality of release passages is opened when the attitude of the pressure vessel 10 changes.

This allows controlling the release direction of the gas from the pressure relief valve 19 without depending on the attitude of the vehicle or the surrounding environment.

Since the substantially cylindrical guide member 80 need only include the linear release passages 82A, 82B (see in particular FIG. 19), the third embodiment can produce advantageous effects of simplifying the configuration of the guide member 80 and reducing the production cost, as compared to the first and second embodiments, for example.

Fourth Embodiment of Release Direction Control Unit 20

Figure 23:
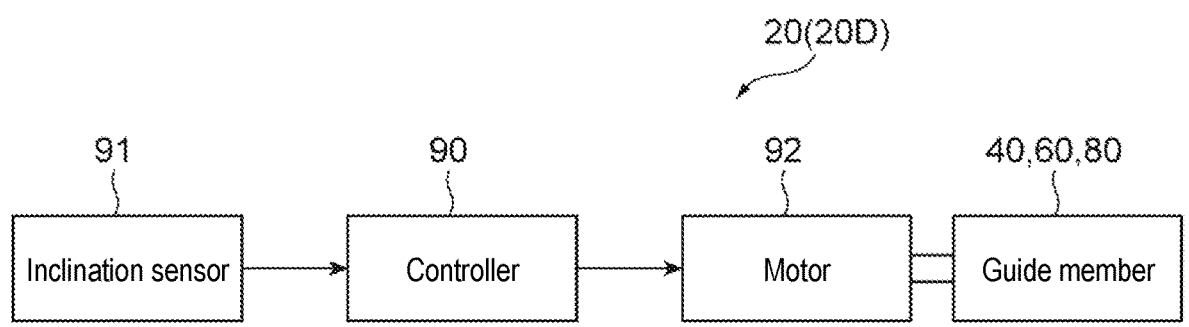
FIG. 23 is a configuration diagram of a release direction control unit including a controller according to a fourth embodiment.
Figure 24:
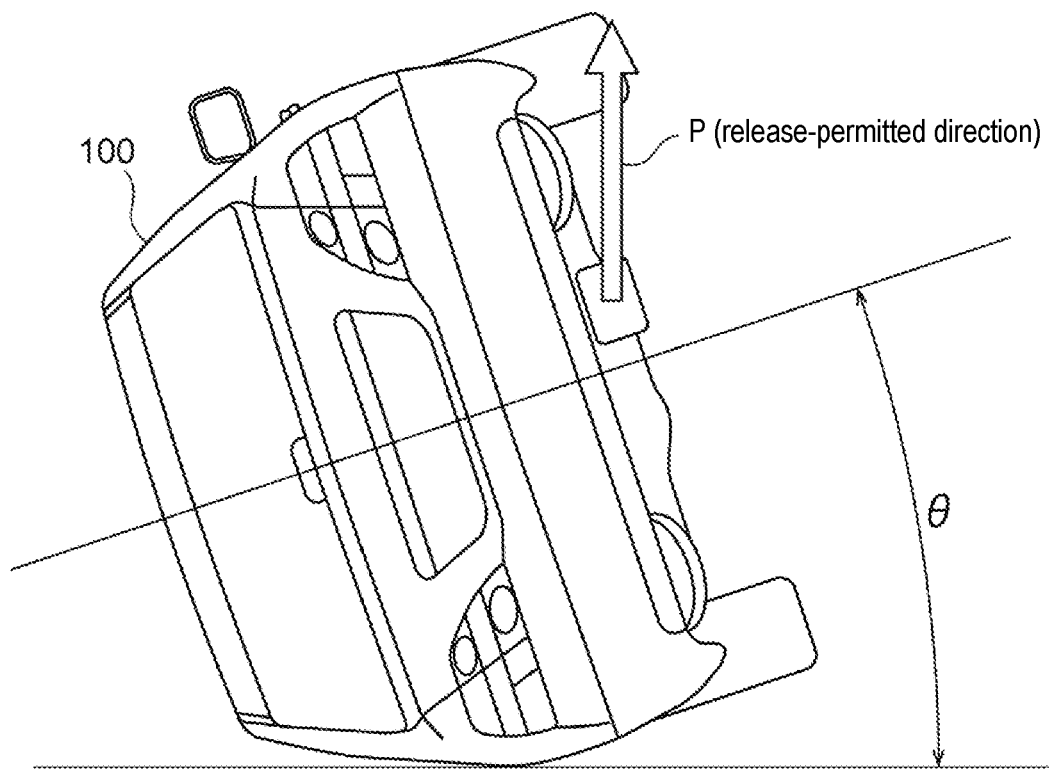
FIG. 24 is a rear view schematically showing the rotated (inclined) vehicle.

With reference to FIG. 23 and FIG. 24, a configuration of the fourth embodiment of the release direction control unit 20 (hereinafter referred to as a release direction control unit 20D) provided on the manifold 14 of the pressure vessel 10 will be described.

In the foregoing first to third embodiments, without depending on the attitude of the vehicle 100, the guide members 40, 60, 80 are configured such that the attitude with respect to the gravity direction will not change with use of gravity (i.e., with weight in balance). Specifically, with use of gravity, even if the attitude of the vehicle 100 (i.e., the pressure vessel 10) changes (rotation or inclination), the guide members 40, 60, 80 move rotationally relative to the manifold 14 (pressure vessel 10) (more specifically, move rotationally so as to offset the change in the attitude of the vehicle 100) such that the attitude with respect to the gravity direction will not change.

As described, in the foregoing first to third embodiments, the guide members 40, 60, 80 are configured such that the center of gravity is disposed eccentrically with respect to the center of rotation, and without depending on the attitude of the pressure vessel 10, the attitude with respect to the gravity direction will not change by the gravity (the guide members 40, 60, 80 are configured to move rotationally relative to the pressure vessel 10 in the opposite direction to the change in the attitude of the pressure vessel 10), and thus the guide members 40, 60, 80 do not require driving means. This can simplify the configuration, reduce the number of components, and reduce the production cost.

Meanwhile, in the release direction control unit 20D of the fourth embodiment, without depending on the attitude of the vehicle 100, the guide members 40, 60, 80 are configured such that the attitude with respect to the gravity direction will not change with use of driving force of a motor 92 as a driving source, instead of gravity.

It should be noted that for a basic configuration of the release direction control unit including the guide member applied in the present embodiment, the one described in the foregoing first to third embodiments can be employed. In addition, it is needless to mention that, instead of the guide members 40, 60, 80 described in the foregoing first to third embodiments, the projection portions 30, 50 including a release passage for releasing gas may be configured to move rotationally as a guide member, for example.

As shown in FIG. 23, the release direction control unit 20D of the present embodiment basically includes a controller 90 as a control device, an inclination sensor 91, and a motor 92.

The inclination sensor 91 is configured to detect an attitude (θ) of the vehicle 100, such as rotation or inclination (see also FIG. 24). It should be noted that the inclination sensor 91 may be an inclination sensor attached to the vehicle 100 or may be the one configured to detect the attitude of the vehicle 100 from an image captured by a camera mounted on the vehicle 100, for example.

The motor 92 is attached to the guide members 40, 60, 80 and driven by an input of a control instruction from the controller 90 (described later), so as to rotate the guide members 40, 60, 80 in a desired direction and by a desired angle.

The controller 90 is configured as a computer including a CPU (Central Processing Unit) (not shown), ROM (Read Only Memory), RAM (Random Access Memory), and the like to control operation of the motor 92.

The controller 90 acquires attitude information of the vehicle 100 (i.e., the pressure vessel 10) from a signal acquired from the inclination sensor 91, generates a control instruction for controlling the motor 92 based on the acquired attitude information, and outputs the control instruction to the motor 92. Driving the motor 92 based on this control instruction can rotate the guide members 40, 60, 80 in a desired direction and by a desired angle. In the present embodiment, the controller 90 generates a control instruction to offset (cancel) the change in the attitude of the vehicle 100 and outputs the control instruction to the motor 92. Accordingly, even if the attitude of the vehicle 100 (i.e., the pressure vessel 10) changes (rotation or inclination), the guide members 40, 60, 80 move rotationally relative to the manifold 14 (pressure vessel 10) (more specifically, move rotationally so as to offset the change in the attitude of the vehicle 100) such that the attitude with respect to the gravity direction will not change.

It should be noted that, other than the above-described control instruction, the controller 90 may generate a control instruction to stop the guide members 40, 60, 80 at any position in accordance with the change in the attitude of the vehicle 100 and output the control instruction to the motor 92.

The aspect of releasing the high-pressure gas in the pressure vessel 10 after electronically controlling the guide members 40, 60, 80 to move rotationally by the controller 90 is equal to that described in the foregoing first to third embodiments.

[Operational Effects of the Fourth Embodiment]

As described above, in the fourth embodiment, the pressure vessel 10 includes the inclination sensor 91 for detecting the attitude of the pressure vessel 10, the motor 92 for allowing the guide member to move rotationally, and the controller 90 for controlling the operation of the motor 92 to allow the guide member to move rotationally. The controller 90 controls the operation of the motor 92 so as to offset the change in the attitude of the pressure vessel 10 (to allow the guide member to move rotationally relative to the pressure vessel 10 in the opposite direction to the change in the attitude of the pressure vessel 10) based on the attitude of the pressure vessel 10 detected by the inclination sensor 91.

This allows controlling the release direction of the gas from the pressure relief valve 19 without depending on the attitude of the vehicle or the surrounding environment in the same manner as the foregoing first to third embodiments.

Since the controller 90 electronically controls the guide members 40, 60, 80 to move rotationally with use of the driving force of the motor 92 to determine the release direction of the gas stored in the pressure vessel 10, the fourth embodiment can produce advantageous effects of precisely controlling the release direction of the gas stored in the pressure vessel 10.

It should be noted that in the foregoing first to fourth embodiments, basically the pressure vessel 10 has a configuration adapting to roll rotation of the vehicle 100. However, it is needless to mention in detail that the pressure vessel 10 can have a configuration adapting to pitch rotation of the vehicle 100 by changing the orientation of the release direction control unit 20 or by changing the position of the release direction control unit 20 attached (for example, by attaching the release direction control unit 20 to the right and left side faces of the manifold 14), for example.

Figure 25:
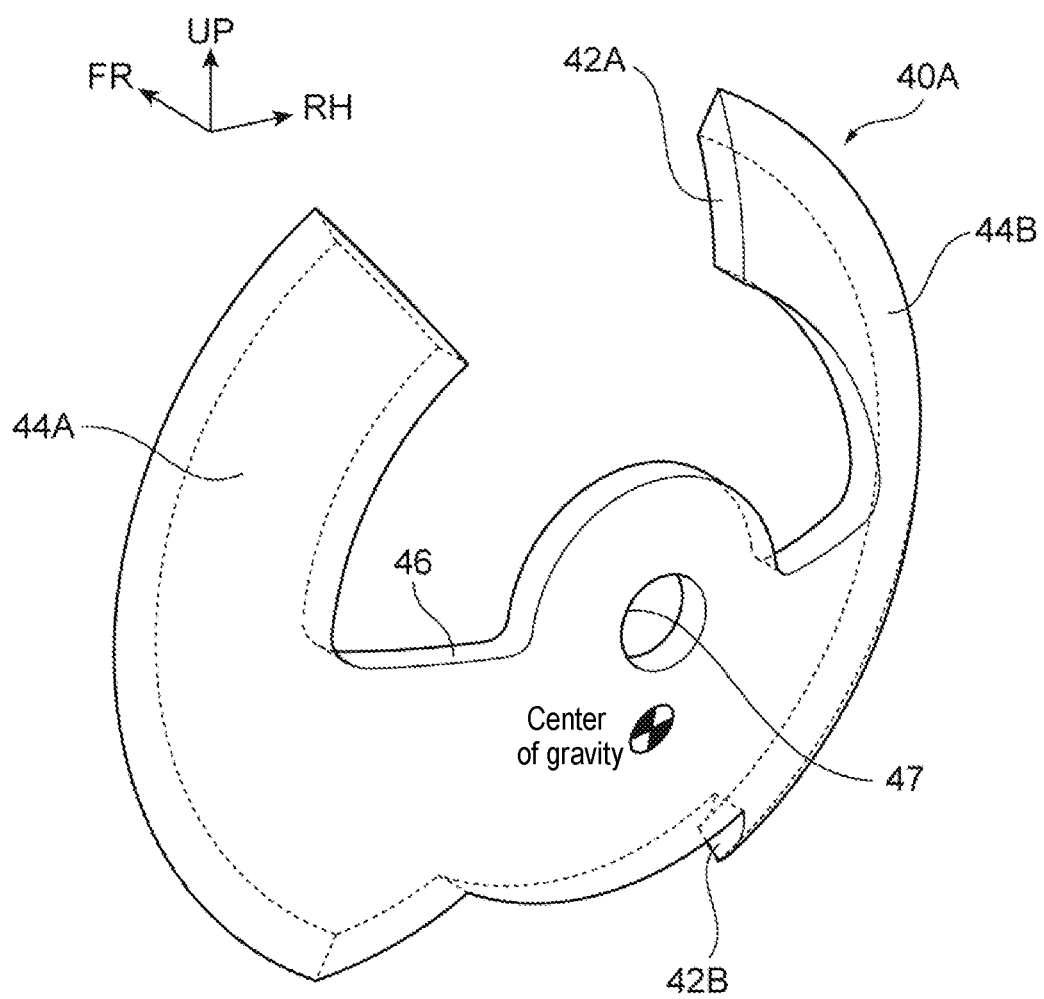
FIG. 25 is a perspective view showing another embodiment of the guide member of the release direction control unit according to the first embodiment in an enlarged manner.

In the foregoing first embodiment, the guide member 40 constituted of a substantially cylindrical body is employed. However, a guide member 40A constituted of a substantially spherical body provided with the release openings 42A, 42B, the shield walls 44A, 44B, the connection portion 46 (insertion hole 47), and the like may be employed as shown in FIG. 25, for example. In this case, the projection portion for forming a release passage around which the guide member 40A is mounted may be similarly formed in a spherical shape, though description of a detailed structure with illustration will be omitted. In addition, it is needless to mention in detail that also in the foregoing second and third embodiments, a guide member constituted of a substantially spherical body may be employed. In this way, by forming a guide member by a substantially spherical body, the pressure vessel 10 with a simple configuration can adapt to rotation and inclination of the vehicle 100 in various directions, such as roll rotation and pitch rotation.

(Operational Effects of the Present Embodiments)

The above-described pressure vessel 10 of the present embodiments stores gas and includes: the pressure relief valve 19 configured to open when the temperature of the pressure vessel 10 reaches a predetermined temperature or higher; and the release direction control unit 20 configured to release the gas in a predetermined direction as the pressure relief valve 19 opens. The release direction control unit 20 is configured to variably change, with respect to the pressure vessel 10, the release direction of the gas as the pressure relief valve 19 opens, and without depending on the attitude of the pressure vessel 10, release the gas stored in the pressure vessel 10 as the pressure relief valve 19 opens (only) in the release-permitted direction set in advance with respect to the gravity direction, not in the release-restricted direction set in advance with respect to the gravity direction.

In addition, the release direction control unit 20 is configured to variably change, with respect to the pressure vessel 10, the release direction of the gas as the pressure relief valve 19 opens so as to offset the change in the attitude of the pressure vessel 10.

In addition, the release direction control unit 20 includes the guide member 40, 60, 80 provided with a release opening or a release passage (formed to extend along a predetermined direction) for releasing the gas and configured to move rotationally relative to the pressure vessel 10, and is configured to allow the guide member 40, 60, 80 to move rotationally relative to the pressure vessel 10 in accordance with the change in the attitude of the pressure vessel 10, and variably change, with respect to the pressure vessel 10, the release direction of the gas as the pressure relief valve 19 opens.

According to the present embodiments, since the release direction of the gas in the pressure vessel 10 (i.e., release-permitted direction) and the direction in which the gas in the pressure vessel 10 should not be released (i.e., release-restricted direction) can be variably changed with respect to the pressure vessel 10 including the pressure relief valve 19, it is possible to adapt the release direction of the gas in the pressure vessel 10 (i.e., release-permitted direction) and the direction in which the gas in the pressure vessel 10 should not be released (i.e., release-restricted direction) to the attitude of the vehicle or the surrounding environment.

In other words, it is possible to control the release direction of the gas from the pressure relief valve 19 without depending on the attitude of the vehicle or the surrounding environment.

Although the embodiments of the present disclosure have been described above, the present disclosure is not limited to the above embodiments or modifications, and can be implemented with various configurations without departing from the spirit of the present disclosure. For example, technical features in the embodiments or modifications corresponding to technical features in each embodiment described in SUMMARY section can be replaced or combined with one another as appropriate in order to solve the above-described problem or to achieve some or all of the above-described advantageous effects. In addition, a technical feature can be deleted as appropriate unless the technical feature is described as an essential configuration in the specification.

DESCRIPTION OF SYMBOLS

1 Pressure vessel unit
2 Case
10 Pressure vessel
12 Mouthpiece
14 Manifold (pipe)
14A General passage
14B Discharge gas passage
16 Valve
19 Pressure relief valve
20, 20A, 20B, 20C, 20D Release direction control unit
30 Projection portion
31 Communication passage
32A, 32B, 32C Release passage
40 Guide member
42A, 42B Release opening
44A, 44B Shield wall
46 Connection portion
47 Insertion hole
50 Projection portion
51 Communication passage
52 Release passage
60 Guide member
62A, 62B Release opening
64A, 64B Shield wall
66 Connection portion
67 Insertion hole
68A, 68B Protrusion
70 Housing portion (storage portion)
71 Communication passage
72 Open space
79 Storage chamber
80 Guide member
81 Communication passage
82A, 82B Release passage
90 Controller
91 Inclination sensor
92 Motor
100 Vehicle

What is claimed is:

1. A pressure vessel storing gas and comprising:
a pressure relief valve configured to open when a temperature of the pressure vessel reaches a predetermined temperature or higher; and
a gas release passage configured to release the gas in a predetermined direction as the pressure relief valve opens,
wherein the gas release passage is configured to:
variably change, with respect to the pressure vessel, a release direction of the gas as the pressure relief valve opens, and
without depending on an attitude of the pressure vessel, release the gas stored in the pressure vessel as the pressure relief valve opens in a release-permitted direction set in advance with respect to a gravity direction, not in a release-restricted direction set in advance with respect to the gravity direction;
wherein the gas release passage
includes a guide member provided with a release opening or a release passage for releasing the gas and configured to move rotationally relative to the pressure vessel, and
is configured to allow the guide member to move rotationally relative to the pressure vessel in accordance with a change in an attitude of the pressure vessel, and variably change, with respect to the pressure vessel, a release direction of the gas as the pressure relief valve opens;
wherein:
the pressure vessel is provided with a projection portion having a plurality of release passages for releasing the gas, and
the guide member
is slidably mounted around the projection portion and includes a shield wall that comes into sliding contact with an outer surface of the projection portion and the release opening for releasing the gas, and
is configured to, when an attitude of the pressure vessel changes, move rotationally relative to the projection portion, close a release passage facing the release-restricted direction with the shield wall, and open a release passage facing the release-permitted direction with the release opening.

2. The pressure vessel according to claim 1, wherein the gas release passage is configured to variably change, with respect to the pressure vessel, a release direction of the gas as the pressure relief valve opens so as to offset a change in an attitude of the pressure vessel.

3. The pressure vessel according to claim 1, wherein the guide member is configured to, when an attitude of the pressure vessel changes, open one release passage facing the release-permitted direction with the release opening.

4. The pressure vessel according to claim 1, wherein the guide member is configured such that a center of gravity is disposed eccentrically with respect to a center of rotation.

5. The pressure vessel according to claim 1, comprising:
an inclination sensor for detecting an attitude of the pressure vessel;
a motor for allowing the guide member to move rotationally; and
a controller for controlling operation of the motor to allow the guide member to move rotationally, wherein the controller is configured to control operation of the motor based on the attitude of the pressure vessel detected by the inclination sensor.

6. The pressure vessel according to claim 1, wherein the release-restricted direction includes a predetermined angular range with respect to a horizontal direction and the release-permitted direction includes a predetermined angular range with respect to a vertical direction other than the release-restricted direction.

7. A pressure vessel storing gas and comprising:
a pressure relief valve configured to open when a temperature of the pressure vessel reaches a predetermined temperature or higher; and
a gas release passage configured to release the gas in a predetermined direction as the pressure relief valve opens,
wherein the gas release passage is configured to:
variably change, with respect to the pressure vessel, a release direction of the gas as the pressure relief valve opens, and
without depending on an attitude of the pressure vessel, release the gas stored in the pressure vessel as the pressure relief valve opens in a release-permitted direction set in advance with respect to a gravity direction, not in a release-restricted direction set in advance with respect to the gravity direction;
wherein the gas release passage
includes a guide member provided with a release opening or a release passage for releasing the gas and configured to move rotationally relative to the pressure vessel, and
is configured to allow the guide member to move rotationally relative to the pressure vessel in accordance with a change in an attitude of the pressure vessel, and variably change, with respect to the pressure vessel, a release direction of the gas as the pressure relief valve opens;
wherein:
the pressure vessel is provided with a projection portion having at least one release passage for releasing the gas, and
the guide member
is mounted around the projection portion with a gap that allows the gas to pass therethrough, and includes a shield wall that is opposed to an outer surface of the projection portion and the release opening for releasing the gas, and
is configured to, when an attitude of the pressure vessel changes, move rotationally relative to the projection portion, when the release passage is facing the release-restricted direction, block the gas to be released in the release-restricted direction through the release passage with the shield wall and release the gas from the release opening via the gap formed between the projection portion and the shield wall, and when the release passage is facing the release-permitted direction, release the gas to be released in the release-permitted direction through the release passage from the release opening not via the gap.

8. The pressure vessel according to claim 7, wherein
the guide member includes a plurality of release openings, and
the shield wall is provided with a protrusion for releasing the gas to be released in the release-restricted direction through the release passage from one of the plurality of release openings via the gap formed between the projection portion and the shield wall.

9. A pressure vessel storing gas and comprising:
a pressure relief valve configured to open when a temperature of the pressure vessel reaches a predetermined temperature or higher; and
a gas release passage configured to release the gas in a predetermined direction as the pressure relief valve opens,
wherein the gas release passage is configured to:
variably change, with respect to the pressure vessel, a release direction of the gas as the pressure relief valve opens, and
without depending on an attitude of the pressure vessel, release the gas stored in the pressure vessel as the pressure relief valve opens in a release-permitted direction set in advance with respect to a gravity direction, not in a release-restricted direction set in advance with respect to the gravity direction;
wherein the gas release passage
includes a guide member provided with a release opening or a release passage for releasing the gas and configured to move rotationally relative to the pressure vessel, and
is configured to allow the guide member to move rotationally relative to the pressure vessel in accordance with a change in an attitude of the pressure vessel, and variably change, with respect to the pressure vessel, a release direction of the gas as the pressure relief valve opens;
wherein
the pressure vessel is provided with a storage portion including a storage chamber that is open to an outside via an open space, and
the guide member
is rotatably stored in the storage chamber of the storage portion and includes a plurality of release passages for releasing the gas, and
is configured to, when an attitude of the pressure vessel changes, move rotationally relative to the storage portion and open a release passage facing the release-permitted direction via the open space.

10. The pressure vessel according to claim 9, wherein the open space is configured such that one of the plurality of release passages is opened when an attitude of the pressure vessel changes.

* * * * *